United States Patent
Numata et al.

(10) Patent No.: US 10,186,246 B2
(45) Date of Patent: Jan. 22, 2019

(54) MUSICAL PIECE REPRODUCING SYSTEM, DATA OUTPUTTING APPARATUS, AND MUSICAL PIECE REPRODUCING METHOD

(71) Applicant: LYRIC ARTS INC., Minato-ku, Tokyo (JP)

(72) Inventors: Kohei Numata, Tokyo (JP); Jin Saito, Tokyo (JP)

(73) Assignee: COTODAMA INC., Tokyo (JP)

( * ) Notice: Subject to any disclaimer, the term of this patent is extended or adjusted under 35 U.S.C. 154(b) by 0 days.

(21) Appl. No.: 15/557,536

(22) PCT Filed: Mar. 11, 2016

(86) PCT No.: PCT/JP2016/057868
§ 371 (c)(1),
(2) Date: Sep. 12, 2017

(87) PCT Pub. No.: WO2016/143907
PCT Pub. Date: Sep. 15, 2016

(65) Prior Publication Data
US 2018/0047374 A1    Feb. 15, 2018

(30) Foreign Application Priority Data

Mar. 12, 2015 (JP) .................... 2015-049663

(51) Int. Cl.
*G06F 3/16* (2006.01)
*G10H 1/36* (2006.01)
(Continued)

(52) U.S. Cl.
CPC ............ *G10H 1/368* (2013.01); *G06F 3/16* (2013.01); *G06T 13/80* (2013.01); *G11B 27/34* (2013.01);
(Continued)

(58) Field of Classification Search
None
See application file for complete search history.

(56) References Cited

U.S. PATENT DOCUMENTS

| 5,863,206 A | 1/1999 | Narusawa et al. |
| 2008/0066611 A1* | 3/2008 | Makino ................ G10H 1/0008 84/609 |

(Continued)

FOREIGN PATENT DOCUMENTS

| JP | 8-76777 | 3/1996 |
| JP | 10-222177 | 8/1998 |

(Continued)

OTHER PUBLICATIONS

JP 2004-354423 machine translation.*

(Continued)

*Primary Examiner* — Kee M Tung
*Assistant Examiner* — Yanna Wu
(74) *Attorney, Agent, or Firm* — Meunier Carlin & Curfman LLC

(57) ABSTRACT

In a musical piece reproducing system, a reproduction control unit causes a sound device to reproduce a musical piece. A display control unit causes a display device to display motion graphics based on motion graphic data stored in a storage device. The motion graphic data defines, for each type of a musical piece portion, a corresponding motion graphic that the display device should display when a musical piece portion that belongs to a corresponding type is reproduced. The display control unit determines the type of each of musical piece portions contained in the musical piece to be reproduced, and controls the display device in such a way that when each of the musical piece portions is reproduced, the display device displays a motion graphic (Continued)

defined by the motion graphic data in accordance with the type of the musical piece portion.

16 Claims, 23 Drawing Sheets

(51) Int. Cl.
    *G06T 13/80*     (2011.01)
    *G11B 27/34*     (2006.01)

(52) U.S. Cl.
    CPC . *G10H 2210/061* (2013.01); *G10H 2220/005* (2013.01); *G10H 2220/011* (2013.01)

(56) References Cited

U.S. PATENT DOCUMENTS

2010/0092107 A1* 4/2010 Mochizuki ............... G06T 5/00
                                                      382/309
2012/0323559 A1    12/2012  Ikeda et al.
2016/0134855 A1* 5/2016 Ishizaki ............... H04N 21/458
                                                      386/219
2017/0301328 A1* 10/2017 Saito ...................... G10H 1/365

FOREIGN PATENT DOCUMENTS

| JP | 2001-356781 | 12/2001 |
|---|---|---|
| JP | 2003-271158 | 9/2003 |
| JP | 2004-354423 | 12/2004 |
| JP | 2008-257206 | 10/2008 |
| JP | 2012-088402 | 5/2012 |
| JP | 2013-109155 | 6/2013 |

OTHER PUBLICATIONS

International Search Report dated May 24, 2016, from International Application No. PCT/JP2016/057868, 4 pages.

International Preliminary Report on Patentability and English translation of Written Opinion dated Sep. 12, 2017, from International Application No. PCT/JP2016/057868, 8 pages.

* cited by examiner

<FIRST ROW>
\*\*\*\*\*\*\* \*\*\*\*\*\*\* \*\*\*\*\*\*\*

| LETTER | TM11 | TM12 | TM13 |
|---|---|---|---|
| BACKGROUND | BM11 | BM12 | BM13 |

<SECOND ROW>
\*\*\*\*\*\*\*\*\*\*\*\*\*\*\* \*\*\*\*\*\*\*

| LETTER | TM21 | TM22 |
|---|---|---|
| BACKGROUND | BM21 | BM22 |

FIG. 15A

<FIRST ROW>
\*\*\*\*\*\*\* \*\*\*\*\*\*\* \*\*\*\*\*\*\*

| LETTER | TM11 | TM12 | TM13 |
|---|---|---|---|
| BACKGROUND | BM1 | | |

<SECOND ROW>
\*\*\*\*\*\*\*\*\*\*\*\*\*\*\* \*\*\*\*\*\*\*

| LETTER | TM21 | TM22 |
|---|---|---|
| BACKGROUND | BM2 | |

FIG. 15B

MUSICAL PIECE REPRODUCING SYSTEM, DATA OUTPUTTING APPARATUS, AND MUSICAL PIECE REPRODUCING METHOD

CROSS-REFERENCE TO RELATED APPLICATION

The present international application claims the priority based on Japanese Patent Application No. 2015-049663 filed to Japan Patent Office on Mar. 12, 2015, and the entire content of Japanese Patent Application No. 2015-049663 is incorporated herein by reference.

TECHNICAL FIELD

The present disclosure relates to a musical piece reproducing system and a musical piece reproducing method.

BACKGROUND ART

There is a known musical piece reproducing system of related art that causes a display device to display a motion graphic in synchronization with reproduction of a musical piece. There is also a known information processing system of related art that calculates importance of each word contained in lyrics and causes a display device to display an image of letters out of the lyrics in such a way that the higher the importance of the word, the larger the letter image corresponding to the word (see Patent Literature 1, for example). A technology of adding an animation to a letter image to be displayed is also known.

PRIOR ART DOCUMENTS

Patent Documents

Patent Document 1: Japanese Patent Laid-Open No. 2012-088402

SUMMARY OF THE INVENTION

Problems to be Solved by the Invention

In a case where a motion graphic is displayed in synchronization with reproduction of a musical piece, monotonous display of the motion graphic causes a user to be bored and therefore lowers the value of the display of the motion graphic. On the other hand, even if a variety of types of motion graphics are displayed, but if the displayed motion graphics do not match the musical piece, the user is likely to feel discomfort.

Therefore, according to an aspect of the present disclosure, it is desirable to provide a novel technology that allows motion graphics that match a reproduced musical piece to be displayed.

Means for Solving the Problems

A musical piece reproducing system according to an aspect of the present disclosure comprises a reproduction control unit and a display control unit. The reproduction control unit is configured to cause a sound device to reproduce a musical piece. The display control unit is configured to cause a display device to display motion graphics based on motion graphic data stored in a storage device and in synchronization with progress of the musical piece reproduced by the sound device. The motion graphic data defines, for each type of a musical piece portion, a corresponding motion graphic that the display device should display when a musical piece portion that belongs to a corresponding type is reproduced.

The display control unit is configured to determine the type of each of musical piece portions contained in the musical piece reproduced by the sound device. The display control unit controls the display device in such a way that when each of the musical piece portions is reproduced, the display device displays a motion graphic defined by the motion graphic data in accordance with the type of the musical piece portion. The display control unit thus causes the display device to display the motion graphic in synchronization with the progress of the musical piece. Therefore, according to the aspect of the present disclosure, the display device is allowed to display motion graphics that match a reproduced musical piece.

According to the aspect of the present disclosure, the storage device may store the motion graphic data on a musical piece category basis. The display control unit may be configured to cause the display device to display motion graphics based on motion graphic data corresponding to the category of a musical piece reproduced by the sound device out of the motion graphic data stored in the storage device.

According to the aspect of the present disclosure, the motion graphic data may be configured to define, for each type of a section that forms a musical piece as the type of the musical piece portion, a motion graphic that the display device should display.

According to the aspect of the present disclosure, in a case where the display control unit switches a motion graphic displayed by the display device from a first motion graphic to a second motion graphic when the type of the reproduced musical piece portion is switched, the display control unit may be configured to control the display device in such a way that the display device displays a motion graphic for transition having characteristics that is a mixture of characteristics of the first motion graphic and characteristics of the second motion graphic before the motion graphic displayed by the display device is switched to the second motion graphic. The motion graphic for transition allows smooth motion graphic switching.

The motion graphic displayed on the display device may contain a motion graphic relating to a letter image and a motion graphic relating to a background image. The letter image may be a letter image relating to lyrics of a musical piece.

The motion graphic data may be configured to include first definition data that defines the motion graphics relating to letter images and second definition data that defines the motion graphics relating to background images. The motion graphic data may be so configured that at least one of the first definition data or the second definition data defines, for each type of the musical piece portion, a motion graphic that the display device should display.

The first definition data may be configured to define a motion graphic relating to a letter image for each type of lyrics in the musical piece portion as the type of the musical piece portion. The type of lyrics may be determined, for example, by at least one of a number of letters of the lyrics or a reproduction length. According to the first definition data, motion graphics that match the characteristics of the lyrics can be displayed.

According to the aspect of the present disclosure, the musical piece reproducing system may further comprise an acquisition unit configured to acquire data on lyrics of a musical piece reproduced by the sound device with a time code attached to each of letter strings specified by dividing entire lyrics of the musical piece, the time code representing time when display of a corresponding letter string starts.

The display control unit may be configured to control the display device in such a way that the display device displays a motion graphic relating to a letter string, to which the time code corresponding to time in the reproduction of the musical piece are attached, based on the lyrics data and in synchronization with the reproduction of the musical piece performed by the sound device.

The display control unit may be configured to determine, based on the lyrics data, a time difference between time codes attached to a first letter string and a second letter string out of the letter strings, the first letter string and the second letter string adjacent to each other and the first letter string followed by the second letter string.

The display control unit may be configured to control the display device in such a way that display of a motion graphic relating to the first letter string ends at time a predetermined period before time when display of a motion graphic relating to the second letter string starts in accordance with the time codes in a case where the time difference is smaller than a reference.

The display control unit may be configured to control the display device in such a way that the display of the motion graphic relating to the first letter string ends at time a predetermined period after time when the display of the motion graphic relating to the first letter string starts in accordance with the time codes in a case where the time difference is greater than or equal to the reference.

The display control unit may be configured to control the display device in such a way that the display device displays another motion graphic after display of the motion graphic relating to the first letter string but before display of the motion graphic relating to the second letter string in a case where the time difference is greater than or equal to the reference.

The display control unit may be configured to control the display device in such a way that a letter image that forms a motion graphic vibrates in synchronization with at least one of intonation or rhythm in a reproduced portion of the musical piece.

The sound device may be configured to include at least one loudspeaker unit so disposed as to partially cover a display surface of the display device. In this case, the display control unit may be configured to control the display device in such a way that the display device displays a motion graphic including a geometric figure that radially spreads from a circumference of the loudspeaker unit.

According to another aspect of the present disclosure, a musical piece reproducing system may be provided that comprises: a reproduction control unit configured to cause a sound device to reproduce a musical piece; an acquisition unit configured to acquire data on lyrics of a musical piece reproduced by the sound device with a time code attached to each of letter strings specified by dividing entire lyrics of the musical piece, the time code representing time when display of a corresponding letter string starts; and a display control unit configured to control a display device in such a way that the display device displays a motion graphic relating to a letter string, to which the time code corresponding to time in the reproduction of the musical piece are attached, based on the lyrics data acquired by the acquisition unit and in synchronization with the reproduction of the musical piece performed by the sound device. The display control unit may be configured to control the display device on the basis of the time difference.

According to another aspect of the present disclosure, a musical piece reproducing system may be provided that comprises: a reproduction control unit configured to cause a sound device to reproduce a musical piece; an acquisition unit configured to acquire data on lyrics of a musical piece reproduced by the sound device; and a display control unit configured to control a display device in such a way that the display device displays motion graphics for letter images representing the lyrics based on the lyrics data acquired by the acquisition unit and in synchronization with the reproduction of the musical piece performed by the sound device, wherein the display control unit controls the display device in such a way that the letter images vibrate in synchronization with at least one of intonation or rhythm in reproduced portions of the musical piece.

According to another aspect of the present disclosure, a musical piece reproducing system may be provided that comprises: a reproduction control unit configured to cause a sound device including a plurality of loudspeaker units to reproduce a musical piece; and a display control unit configured to cause a display device to display motion graphics in synchronization with progress of the musical piece reproduced by the sound device. The plurality of loudspeaker units may be so disposed as to partially cover a display surface of the display device. In this case, the display control unit may be configured to control the display device in such a way that the display device displays a motion graphic including a geometric figure that radially spreads from a circumference of each of the loudspeaker units.

According to another aspect of the present disclosure, a data outputting apparatus may be provided that comprises: an acquisition unit configured to acquire information on a musical piece; and an output unit configured to output, based on the information on the musical piece acquired by the acquisition unit and motion graphic data stored in a storage device, display data for causing a display device to display motion graphics in synchronization with progress of the musical piece reproduced by a sound device. The output unit may be configured to determine the type of each of musical piece portions contained in the musical piece based on the information on the musical piece and produce, as the display data, display data configured to control the display device in such a way that when each of the musical piece portions is reproduced, the display device displays a motion graphic defined by the motion graphic data in accordance with the type of the musical piece portion.

The acquisition unit may be configured to acquire information on a musical piece reproduced by a sound device. The acquisition unit may acquire the information on the musical piece from an external communication terminal on a network. The output unit may transmit the display data to the external communication terminal having provided the acquisition unit with the information on the musical piece.

According to another aspect of the present disclosure, a musical piece reproducing method may be provided that comprises: causing a sound device to reproduce a musical piece; and controlling a display device to cause the display device to display motion graphics based on motion graphic data stored in a storage device and in synchronization with progress of the musical piece reproduced by the sound device.

Controlling the display device may comprise determining the type of each of musical piece portions contained in the musical piece reproduced by the sound device and controlling the display device in such a way that when each of the musical piece portions is reproduced, the display device displays a motion graphic defined by the motion graphic data in accordance with the type of the musical piece portion, so as to cause the display device to display the motion graphic in synchronization with the progress of the musical piece.

According to another aspect of the present disclosure, a data outputting method may be provided that comprises: acquiring information on a musical piece; and outputting, based on the information on the acquired musical piece and motion graphic data stored in a storage device, display data for causing a display device to display motion graphics in synchronization with progress of the musical piece reproduced by a sound device.

According to the aspect of the present disclosure, outputting the display data may comprise determining the type of each of musical piece portions contained in the musical piece based on the information on the musical piece and producing, as the display data, display data configured to control the display device in such a way that when each of the musical piece portions is reproduced, the display device displays a motion graphic defined by the motion graphic data in accordance with the type of the musical piece portion.

Acquiring may comprise acquiring information on a musical piece reproduced by a sound device. Acquiring may comprise acquiring the information on the musical piece from an external communication terminal on a network. Outputting may comprise transmitting the display data to the external communication terminal having provided the acquisition unit with the information on the musical piece.

According to another aspect of the present disclosure, at least one of the musical piece reproducing method or the data outputting method may be performed by a computer. According to another aspect of the present disclosure, a program for causing a computer to perform at least one of the musical piece reproducing method or the data outputting method may be provided.

According to another aspect of the present disclosure, a musical piece reproducing system comprising a processor and a memory that stores instructions executed by the processor may be provided. The processor may execute the instructions to operate as at least one of the reproduction control unit, the display control unit, or the acquisition unit. According to another aspect of the present disclosure, a data outputting apparatus comprising a processor and a memory that stores instructions executed by the processor may be provided. The processor may execute the instructions to operate as at least one of the acquisition unit or the output unit.

According to another aspect of the present disclosure, a program for causing a computer to operate as at least one of the reproduction control unit, the display control unit, or the acquisition unit may be provided. According to another aspect of the present disclosure, a program for causing a computer to operate as at least one of the acquisition unit or the output unit may be provided. According to another aspect of the present disclosure, a non-transitory tangible storage medium that stores the program may be provided. According to another aspect of the present disclosure, one or more of the units described above may be achieved by hardware.

BRIEF DESCRIPTION OF THE DRAWINGS

FIGS. 15A and 15B show motion graphic switching aspects in the second embodiment.

MODE FOR CARRYING OUT THE INVENTION

Exemplary embodiments of the present disclosure will be described below with reference to the drawings.

First Embodiment

Figure 1:
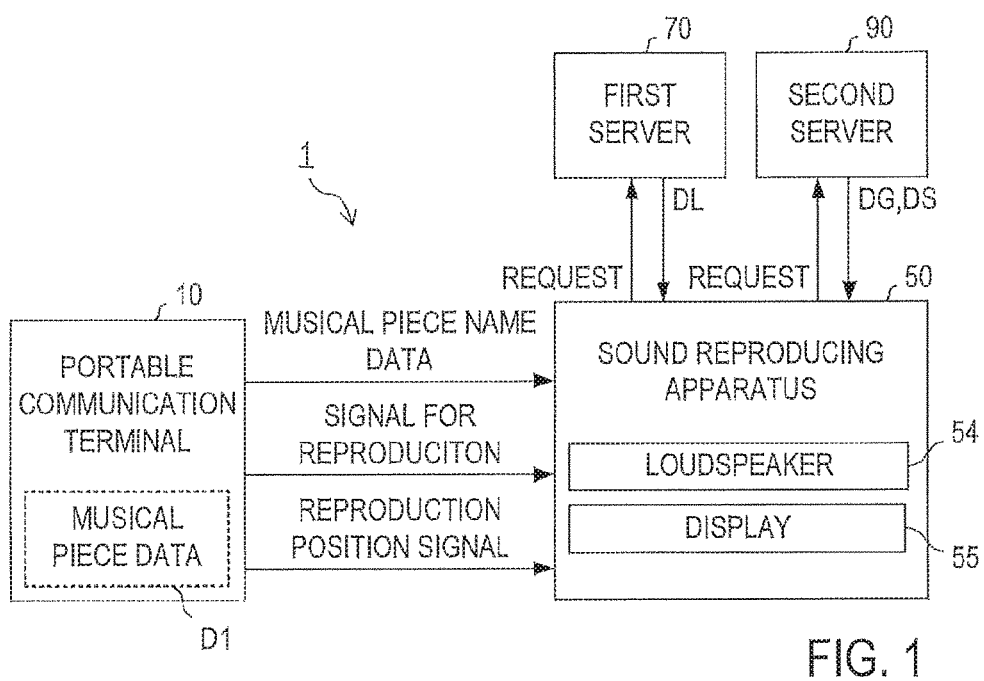
FIG. 1 is a block diagram showing a schematic configuration of a musical piece reproducing system.

A musical piece reproducing system 1 according to the present embodiment shown in FIG. 1 includes a portable communication terminal 10, a sound reproducing apparatus 50, a first server 70, and a second server 90. The portable communication terminal 10 may, for example, be a smartphone or a tablet terminal.

In the musical piece reproducing system 1, the portable communication terminal 10 performs a reproduction processing of musical piece data D1 and transmits: a signal for reproduction corresponding to the musical piece data D1 and a reproduction position signal to the sound reproducing apparatus 50. The portable communication terminal 10 transmits, prior to the reproduction processing, musical piece name data of the musical piece to be reproduced on the basis of the musical piece data D1 to the sound reproducing apparatus 50.

The sound reproducing apparatus 50 acquires lyrics data DL corresponding to the musical piece data D1 to be reproduced from the first server 70 on the basis of the musical piece name data received from the portable communication terminal 10 and further acquires musical piece category data DG representing the category of the corresponding musical piece and musical piece structure data DS representing the structure of the corresponding musical piece from the second server 90.

The sound reproducing apparatus 50 outputs the corresponding musical piece from a loudspeaker 54 on the basis of the signal for reproduction from the portable communication terminal 10 and causes a display 55 to display motion graphics in synchronization with the reproduction of the musical piece on the basis of the reproduction position signal from the portable communication terminal 10. The motion graphics contain letter images representing lyrics. The sound reproducing apparatus 50 determines an aspect of the display of the motion graphics on the basis of the musical piece category data DG and the musical piece structure data DS acquired from the second server 90.

The communication between the portable communication terminal 10 and the sound reproducing apparatus 50 is achieved by at least one of short-range wireless communication represented by Bluetooth (registered trademark) or wireless LAN communication. The communication between the sound reproducing apparatus 50 and the first and second servers 70, 90 is achieved by a wide area network. The wide area network is, for example, the Internet.

Figure 2:
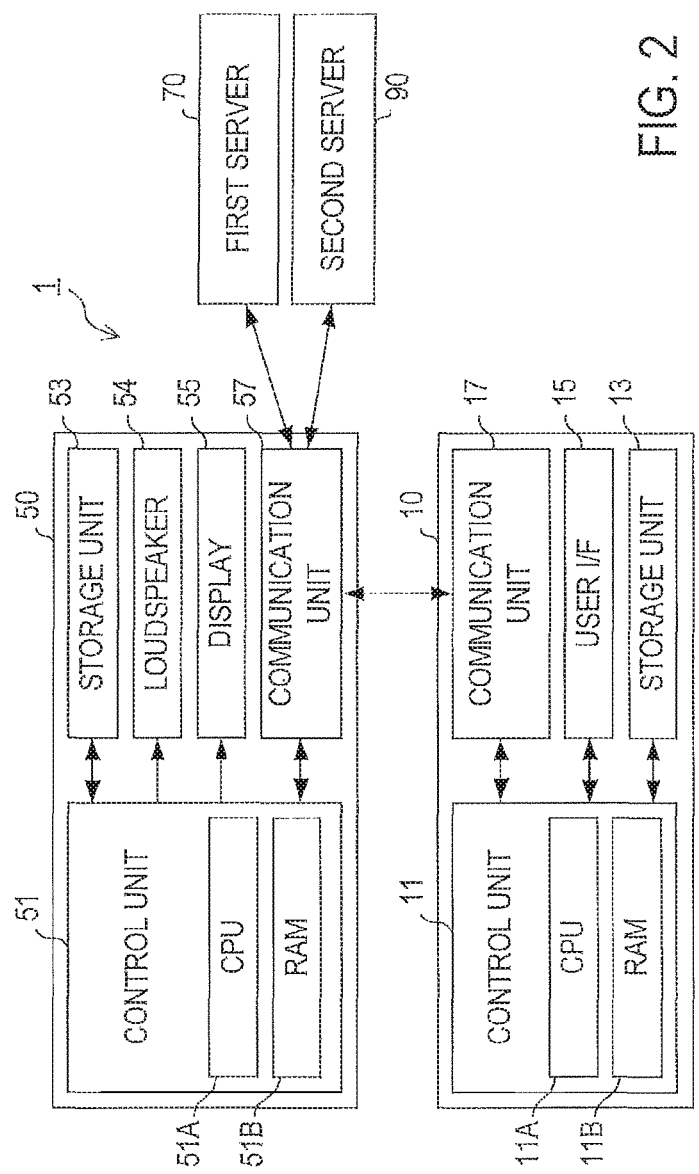
FIG. 2 is a block diagram showing a schematic configuration of a portable communication terminal and a sound reproducing apparatus.

The portable communication terminal 10 includes a control unit 11, a storage unit 13, a user interface 15, and a communication unit 17, as shown in FIG. 2. The control unit 11 includes a CPU 11A and a RAM 11B. The CPU 11A carries out processes according to a computer program stored in the storage unit 13. The RAM 11B is used as a work area when the CPU 11A carries out a process. In the following sections, a process carried out by the CPU 11A in accordance with the computer program is described as a process carried out by the portable communication terminal 10 or the control unit 11.

The storage unit 13 stores a variety of computer programs and data. The data stored in the storage unit 13 includes one or more musical piece data D1. The storage unit 13 is formed, for example, of a flash memory.

The user interface 15 includes a display and a touch panel. The user interface 15 displays a variety of screens on the display under the control of the control unit 11 and inputs an operation signal from the user issued via the touch panel to the control unit 11. The communication unit 17 is configured to be capable of performing the short-range wireless communication and the wireless LAN communication. The control unit 11 wirelessly communicates with the sound reproducing apparatus 50 via the communication unit 17.

The sound reproducing apparatus 50 includes a control unit 51, a storage unit 53, the loudspeaker 54, the display 55, and a communication unit 57. The control unit 51 includes a CPU 51A and a RAM 51B, and the CPU 51A carries out processes according to a variety of programs. The RAM 51B is used as a work area when the CPU 51A carries out a process. In the following sections, a process carried out by the CPU 51A in accordance with a program is described as a process carried out by the sound reproducing apparatus 50 or the control unit 51.

The storage unit 53 stores a variety of programs and data. The data stored in the storage unit 53 includes motion graphic data D2 (see FIG. 3) on a musical piece category basis. The sound reproducing apparatus 50 may be configured to be capable of acquiring the motion graphic data D2 from an external server via the wide area network.

The loudspeaker 54 includes a plurality of loudspeaker units and amplifiers corresponding to a plurality of different sound ranges, converts an audio signal inputted from the control unit 51 into sound, and outputs the sound. The display 55 is formed, for example, of a liquid crystal display. During reproduction of a musical piece, the display 55 displays motion graphics including letter images representing the lyrics under the control of the control unit 51. The motion graphics displayed on the display 55 include changes in the letter images and changes in background images.

The communication unit 57 is configured to be capable of performing short-range wireless communication and wireless LAN communication, as in the case of the portable communication terminal 10. The control unit 51 communicates with the portable communication terminal 10 via the communication unit 57 over the short-range wireless communication or the wireless LAN communication. The control unit 51 communicates with the first server 70 and the second server 90 in the wide area network via the communication unit 57.

The first server 70 is configured to transmit, in accordance with a request signal from the sound reproducing apparatus 50, the lyrics data DL requested by the sound reproducing apparatus 50 to the sound reproducing apparatus 50. The second server 90 is configured to transmit, in accordance with a request signal from the sound reproducing apparatus 50, the musical piece category data DG, which represents the category of a musical piece requested by the sound reproducing apparatus 50, and the musical piece structure data DS, which represents the structure of the musical piece, to the sound reproducing apparatus 50. The sound reproducing apparatus 50 may be configured to acquire the lyrics data DL, the musical piece category data DG, and the musical piece structure data DS from an existing server.

As the second server 90, there is a known server that automatically analyzes musical elements contained in a musical piece while recognizing repeat structures and changes of tone of the musical piece and accumulates musical piece structure data DS based on the result of the analysis along with the musical piece category data DG. For example, musical piece structure data DS on a POP musical piece contains information that allows identification of sections, such as "introduction", "melody A (verse)", "melody B (pre-chorus)", "middle part (chorus)", "melody C (bridge)", "outro (ending)", and "interlude". The "melody A", "melody B", "middle part", and "melody C" are expressions in the Japanese market. The "melody A", "melody B", "middle part", and "melody C" correspond to the "verse", "pre-chorus", "chorus", and "bridge", respectively, as described above with parentheses.

The musical piece structure data DS contains information that allows identification of a section having a point where the tune changes as a boundary, a section showing iterativeness, a section corresponding, for example, to a middle part (chorus) showing a climax, and other sections that form a musical piece. The musical piece structure data DS may have a configuration in which a section having a point where the tune changes as a boundary contains a subsection showing iterativeness and a subsection showing a climax.

Figure 3:
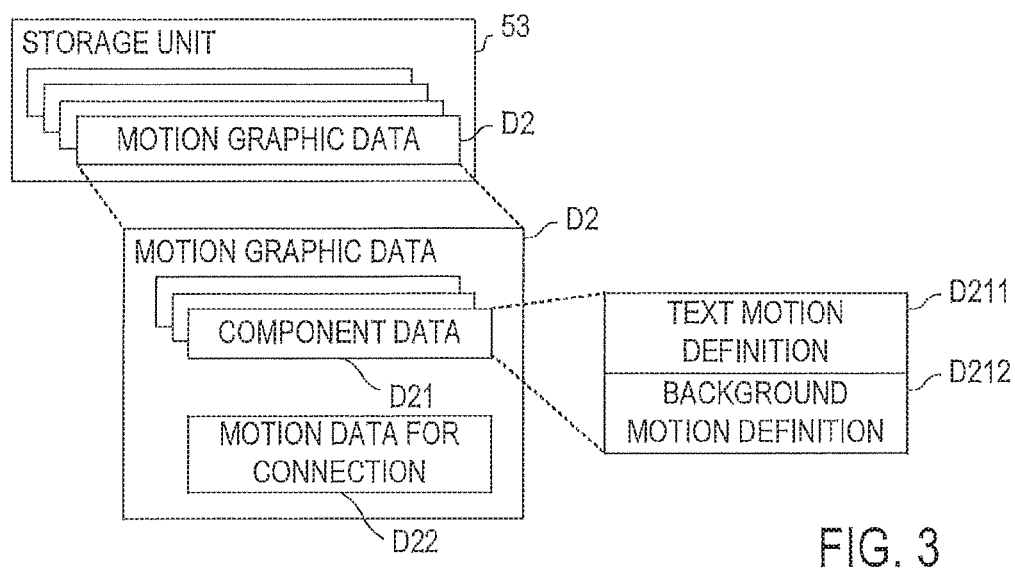
FIG. 3 shows the configuration of motion graphic data.

A description will be subsequently made of the configuration of the motion graphic data D2, which is stored in the storage unit 53 of the sound reproducing apparatus 50 on a musical piece category basis. The motion graphic data D2 is configured to have component data D21 for each of types of section contained in a musical piece of the corresponding category, as shown in FIG. 3. Each component data D21 defines a motion graphic that should be displayed on the display 55 when a musical piece portion of a section of a specific type contained in the musical piece of the corresponding category is reproduced.

The musical piece category used herein may be defined by the classification including POP music, R&B, rock, and other categories, may be classified on the basis of the mood of a musical piece, for example, the atmosphere and impression thereof, or may be defined by the combination thereof.

Figure 4:
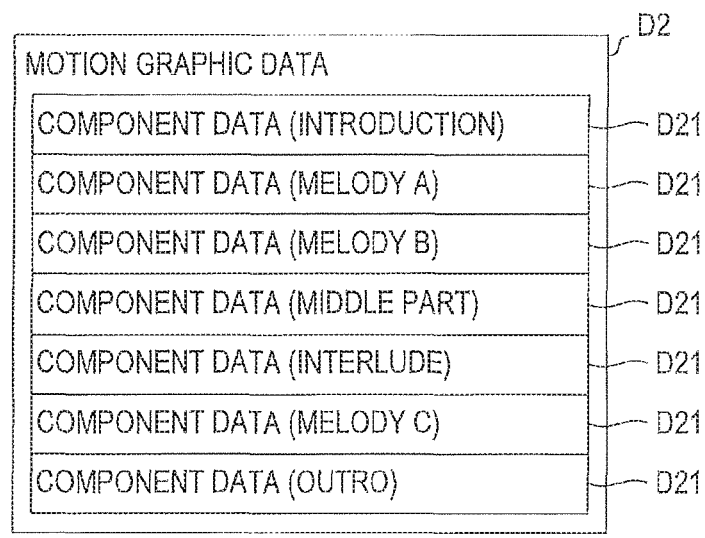
FIG. 4 shows a specific example of the motion graphic data.

The section corresponding to the component data D21 is defined as a section distinguished from the other sections in terms of the tune, iterativeness, climax, and other factors, as in the musical piece structure data DS. For example, the motion graphic data D2 is configured to have component data D21 for each of sections corresponding to the "introduction", "melody A", "melody B", "middle part", "interlude", "melody C", and "outro", as shown in FIG. 4. The definition of a section is, however, not limited to the example described above. The section may be defined based only on the tune.

As shown in FIG. 3, the component data D21 is configured to have text motion definition data D211, which defines the motion of a letter image (lyrics) that should be displayed on the display 55 when a musical piece portion of the corresponding section is reproduced, and background motion definition data D212, which defines the motion of a background image that should be displayed on the display 55 along with the letter image.

The text motion definition data D211 defines the font type and size of the letter image and the pattern and speed of the motion thereof the letter image. The background motion definition data D212 defines the type of the background image and the pattern and speed of the motion of the background image. In the following description, the pattern of the motion is also expressed as a "motion pattern".

FIGS. 5A, 5B, 5C, and 5D show examples of the motion pattern of a letter image. The portion inside the rectangular frame drawn by the solid line in each of FIGS. 5A to 5D corresponds to the display screen of the display 55. The open circle represents the point where the letter image appears, the filled circle represents the point where the letter image disappears, and the arrow represents the direction of the motion.

Figure 5A:
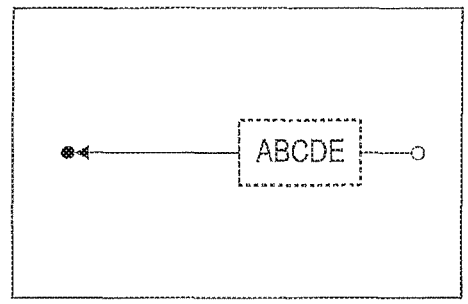
FIGS. 5A to 5D show examples of a motion graphic for a letter image.
Figure 5B:
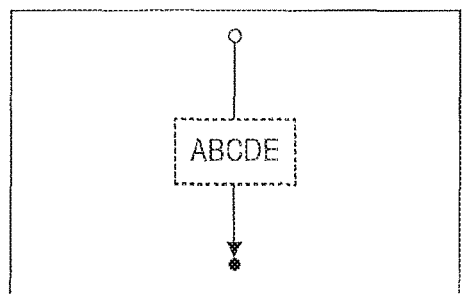
Figure 5C:
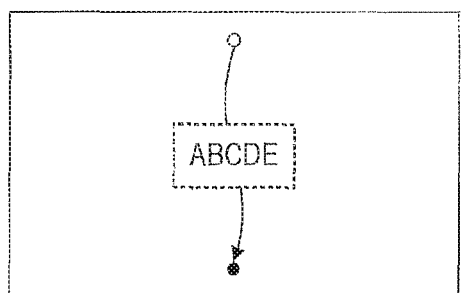
Figure 5D:
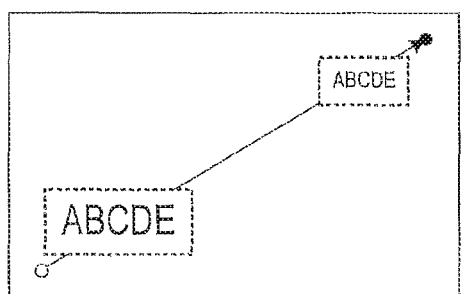

FIG. 5A shows a motion pattern in which a letter image "ABCDE" changes in such a way that it flows from right to left of the display screen along a straight line. FIG. 5B shows a motion pattern in which the letter image "ABCDE" changes in such a way that it flows from the upper side to the lower side of the display screen along a straight line. FIG. 5C shows a motion pattern in which the letter image "ABCDE" changes in such a way that it flows from the upper side to the lower side of the display screen along a curved line. FIG. 5D shows a motion pattern in which the letter image "ABCDE" is displaced from the lower left corner to the upper right corner of the display screen with the size of the letter image changing. The motion pattern shown in FIG. 5D is an example of a motion pattern that causes a user to associate the motion pattern with motion in which the letter image "ABCDE" appears in a position in front of the screen, moves, and disappears in a position behind the screen.

A motion pattern in which a letter image slowly flows along a curved line is a motion pattern suitable for a musical piece portion having a mild tune, and a motion pattern in which a letter image quickly flow along a straight line is a motion pattern suitable for a vigorous musical piece portion. A motion pattern in which a letter image is enlarged is a motion pattern suitable for a climax portion of a musical piece.

The impression made by a motion pattern on the user varies in accordance with the type of motion pattern. The text motion definition data D211 in each of the component data D21 is so created that the motion pattern of a letter image matches the impression of a musical piece portion of the corresponding category and section.

Figure 6A:
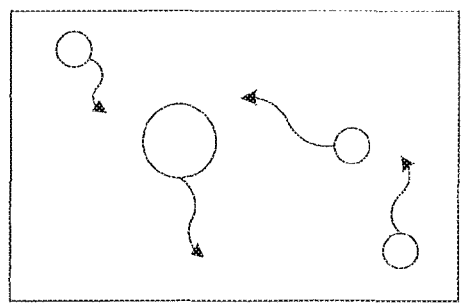
FIGS. 6A and 6B show examples of a motion graphic for a background image.
Figure 6B:
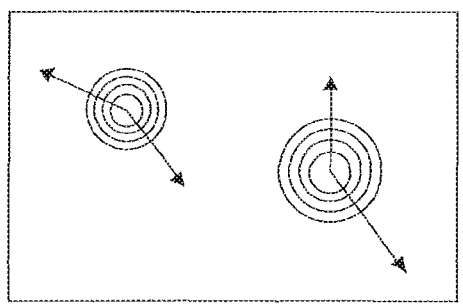

FIGS. 6A and 6B show examples of the motion pattern of a background image. The portion inside the rectangular frame drawn by the solid line in each of FIGS. 6A and 6B corresponds to the display screen of the display 55, and the arrow represents the direction of the motion.

FIG. 6A shows a motion pattern of a background image in which a geometric figure that forms a polka-dot pattern changes on the display screen in such a way that the geometric figure float. FIG. 6B shows a motion pattern of a background image in which a wave pattern radially spreads on the display screen. In comparison of the motion patterns described above with each other, the motion pattern shown in FIG. 6A is likely to make milder impression than the motion pattern shown in FIG. 6B on the user. The impression made by the motion pattern of a background image on the user also varies in accordance with the type of motion pattern. The background motion definition data D212 contained in the component data D21 is so created that the motion pattern of a background image matches the impression of a musical piece portion of the corresponding category and section.

Further, the motion graphic data D2 may have a motion data for connection D22 for reducing the discontinuity between motion graphics at the boundary of a section. The motion data for connection D22 defines, for each combination of component data D21 contained in the motion graphic data D2, a motion graphic that should be achieved when a motion graphic based on one component data D21 transitions to a motion graphic based on another component data D21.

Figure 7A:
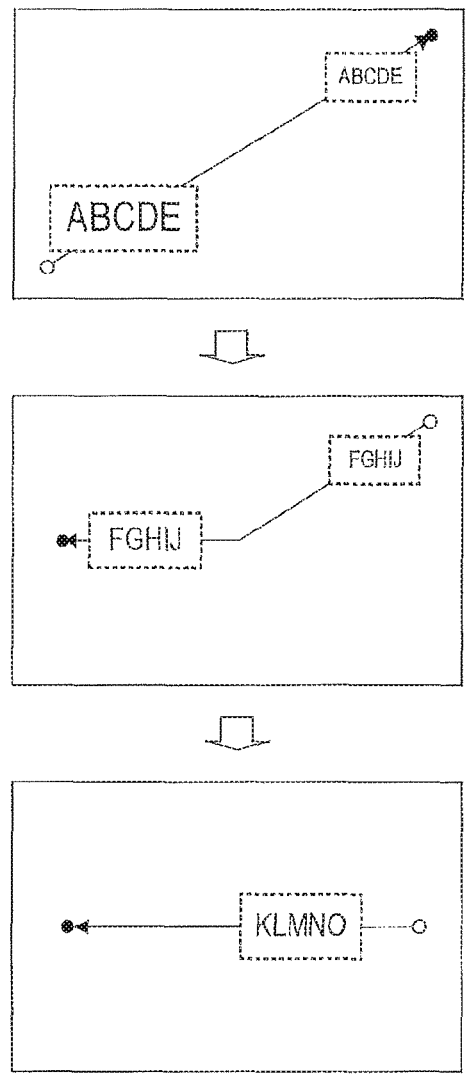
FIG. 7A shows an example of a motion graphic in a transition period.

For example, as a motion graphic corresponding to a transition period from a preceding section in which a letter image changes in the motion pattern shown in the upper portion of FIG. 7A to a subsequent section in which a letter image changes in the motion pattern shown in the lower portion of FIG. 7A, a motion graphic shown in the middle portion of FIG. 7A may be defined. The motion pattern shown in the upper portion of FIG. 7A corresponds to the motion pattern shown in FIG. 5D, and the motion pattern shown in the lower portion of FIG. 7A corresponds to the motion pattern shown in FIG. 5A. That is, a motion graphic in which the last letter image "FGHIJ" in the preceding section or the first letter image "FGHIJ" in the subsequent section is so displaced as to be exceptionally deflected from the upper right portion to the left central portion may be defined as the motion graphic for the transition period. The letter image "KLMNO" shown in the lower portion of FIG. 7A is a letter image displayed after the letter image "FGHIJ". As described above, as the motion graphic for the transition period, a motion graphic in which characteristics of the preceding section and characteristics of the subsequent section are mixed with each other or an intermediate motion graphic between the motion graphic for the preceding section and the motion graphic for the subsequent section may be defined.

Figure 7B:
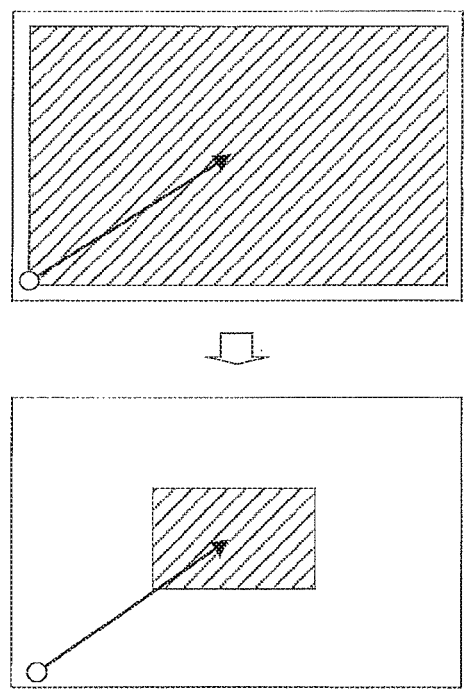
FIG. 7B shows an example of motion in a transition period.

As a motion graphic corresponding to the transition period between two sections having background images of different types, a motion graphic in which the entire screen of the preceding section (corresponding to hatched area) is shrunk to a specific point on the display screen and eliminated may be defined, as shown in FIG. 7B. An existing fade-out/fade-in technology may instead be used. A variety of forms of motion graphics other than the forms described above can be employed.

Figure 8:
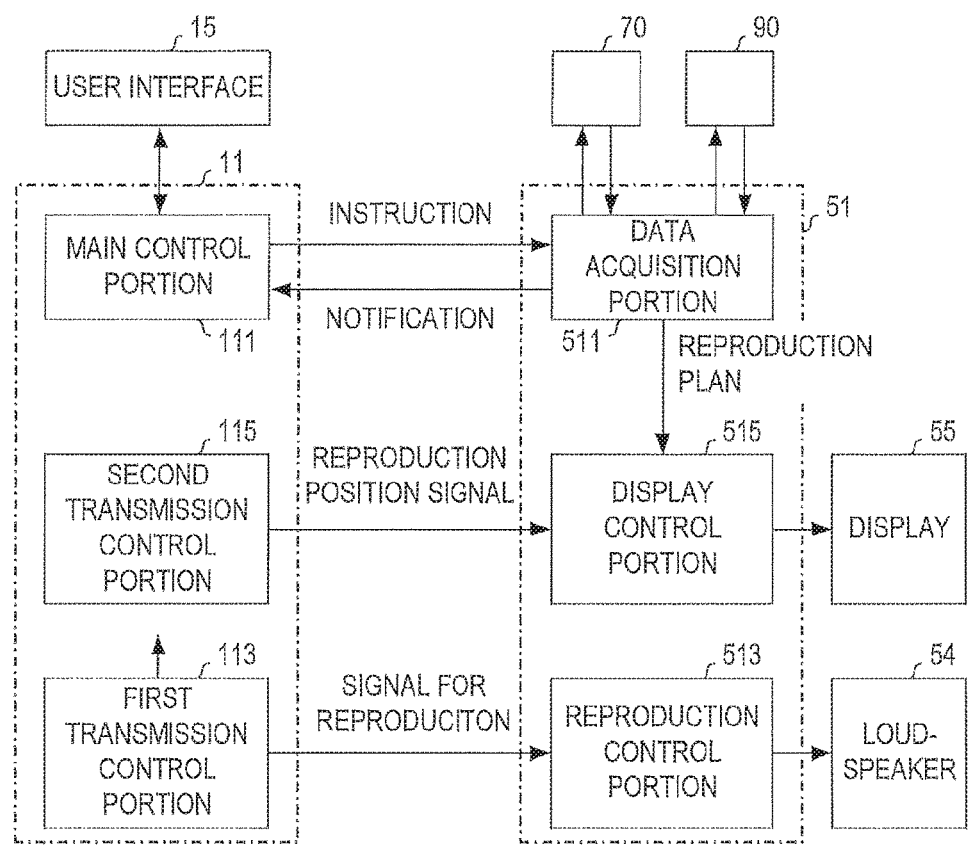
FIG. 8 is a block diagram showing functions achieved by control units of the portable communication terminal and the sound reproducing apparatus.

Functions achieved by the control unit 11 of the portable communication terminal 10 will be subsequently described in detail with reference to FIG. 8. The control unit 11, when it executes a program, functions as a main control portion 111, a first transmission control portion 113, and a second transmission control portion 115.

When a reproduction instruction of one musical piece data D1 stored in the storage unit 13 is inputted from the user to the main control portion 111 via the user interface 15, the main control portion 111 transmits an action instruction to which musical piece name data is attached to the sound reproducing apparatus 50 via the communication unit 17, the musical piece name data corresponding to the musical piece data D1 that has been specified by the reproduction instruction and is therefore a target to be reproduced.

The musical piece data D1 has a configuration in which meta data is attached to a musical piece data body. The meta data has information on a musical piece, such as the name of the musical piece, the name of the composer, and the name of the lyric writer. The main control portion 111 refers to the meta data and transmits an action instruction to which musical piece name data corresponding to the musical piece data D1 to be reproduced is attached to the sound reproducing apparatus 50. The musical piece name data is used by the sound reproducing apparatus 50 to acquire the lyrics data DL, the musical piece category data DG, and the musical piece structure data DS corresponding to the musical piece data D1 to be reproduced from the servers 70 and 90.

The main control portion 111, when it receives preparation completion notification transmitted from the sound reproducing apparatus 50 in response to the action instruction, issues a process start instruction to the first transmission control portion 113 and the second transmission control portion 115.

The first transmission control portion 113 carries out the reproduction processing of the musical piece data D1 in accordance with the process start instruction to transmit a signal for reproduction of the musical piece data D1 to the sound reproducing apparatus 50 via the communication unit 17. The reproduction processing carried out by the first transmission control portion 113 may be the processing of decoding the musical piece data D1 into a form that allows the sound reproducing apparatus 50 to output the musical piece from the loudspeaker 54. In the present embodiment, as the reproduction processing described above, the first transmission control portion 113 carries out the processing of achieving stream reproduction of the musical piece data D1.

The second transmission control portion 115 transmits the reproduction position signal representing the reproduction position in the musical piece data D1 being reproduced by the first transmission control portion 113 in accordance with the process start instruction to the sound reproducing apparatus 50 via the communication unit 17. The second transmission control portion 115 may be configured to acquire information on the reproduction position managed by the first transmission control portion 113 from the first transmission control portion 113 and transmit the reproduction position signal representing the reproduction position.

Functions achieved by the control unit 51 of the sound reproducing apparatus 50 will subsequently be described in detail. The control unit 51 of the sound reproducing apparatus 50, when it executes a program, functions as a data acquisition portion 511, a reproduction control portion 513, and a display control portion 515.

The data acquisition portion 511 acquires the lyrics data DL from the first server 70 and acquires the musical piece category data DG and the musical piece structure data DS from the second server 90 in accordance with the action instruction from the portable communication terminal 10. To this end, the data acquisition portion 511 repeatedly carries out the processes shown in FIG. 9. That is, the data acquisition portion 511 waits until it receives the action instruction transmitted from the portable communication terminal 10 via the communication unit 57 (S110).

The data acquisition portion 511, when it receives the action instruction (Yes in S110), acquires the lyrics data DL corresponding to the musical piece data D1 to be reproduced by the portable communication terminal 10 from the first server 70 on the basis of the musical piece name data attached to the action instruction received from the portable communication terminal 10 (S120). Further, the data acquisition portion 511 acquires the musical piece category data DG and the musical piece structure data DS corresponding to the musical piece data D1 to be reproduced by the portable communication terminal 10 from the second server 90 (S130).

The data acquisition portion 511 then identifies a musical piece category of the musical piece data D1 to be reproduced on the basis of the musical piece category data DG acquired from the second server 90 and reads motion graphic data D2 on the identified musical piece category from the storage unit 53 (S140).

The data acquisition portion 511 further creates a motion graphic reproduction plan on the basis of the group of the component data D21 and the motion data for connection D22 contained in the read motion graphic data D2 and the types and arrangement of the sections that form the musical piece identified from the musical piece structure data DS (S150). The reproduction plan represents the procedure of displaying motion graphics that the display 55 is caused to display in synchronization with the reproduction of the musical piece from the start to the end thereof.

For example, in a case where the musical piece reproduced on the basis of the musical piece data D1 to be reproduced is a musical piece played in the order of: "introduction", "melody A", "melody B", "middle part", "interlude", "melody A", "melody B", "middle part", "interlude", "melody C", "middle part", and "outro", the corresponding component data D21 are referred in the order described above, and a motion graphic that the display 55 is caused to display when a musical piece portion corresponding to each of the sections is reproduced is determined. Further, a motion graphic that the display 55 is caused to display in the transition period between sections is determined on the basis of the motion data for connection D22. The data acquisition portion 511 thus determines in advance motion graphics that the display 55 is caused to display in synchronization with the progress of the musical piece on the basis of the data acquired from the server 70 and 90 and the motion graphic data D2 stored in the storage unit 53 and creates a reproduction plan according to a result of the determination.

The data acquisition portion 511 then transmits the preparation completion notification to the portable communication terminal 10 (S160). Having received the preparation completion notification, the portable communication terminal 10 starts performing the reproduction processing of the musical piece data D1 and sends the signal for reproduction and the reproduction position signal.

The reproduction control portion 513 receives the signal for reproduction from the portable communication terminal 10 via the communication unit 57 and inputs an audio signal for outputting sound based on the signal for reproduction to the loudspeaker 54 to achieve musical piece reproduction via the loudspeaker 54.

On the other hand, the display control portion 515 receives the reproduction position signal transmitted from the portable communication terminal 10 via the communication unit 57 and controls the display 55 in accordance with the reproduction plan created in S150 in such a way that motion graphics corresponding to the sound outputted from the loudspeaker 54 are displayed on the display 55 on the basis of the reproduction position signal. The control unit 51 thus controls the display 55 in such a way that the display 55 is caused to display the motion graphics containing lyrics letter images in synchronization with the progress of the reproduced musical piece.

The configuration of the musical piece reproducing system 1 according to the present embodiment has been described. According to the musical piece reproducing system 1, the data acquisition portion 511 in the sound reproducing apparatus 50 acquires the motion graphic data D2 corresponding to the category of a musical piece to be reproduced via the loudspeaker 54 from the storage unit 53. The reproduction control portion 513 is configured to input an audio signal to the loudspeaker 54 to reproduce the musical piece. The display control portion 515 is configured to cause the display 55 to display motion graphics in synchronization with the progress of the musical piece reproduced via the loudspeaker 54. The storage unit 53 stores the motion graphic data D2 on a musical piece category basis. The motion graphic data D2 stored on the category basis in the storage unit 53 has component data D21 for each type of a musical piece portion of the corresponding category. Specifically, the motion graphic data D2 has component data D21 on a section type basis.

The control unit 51 controls the display 55 by properly using the component data D21 contained in the motion graphic data D2 in accordance with the types and arrangement of the sections contained in the musical piece reproduced via the loudspeaker 54 to cause the display 55 to display motion graphics according to the progress of the musical piece.

The musical piece reproducing system 1 according to the present embodiment can therefore appropriately cause the display 55 to display motion graphics in synchronization with the progress of a musical piece being reproduced. That is, the musical piece reproducing system 1 can handle a variety of musical pieces in different categories in such a way that the musical piece reproducing system 1 appropriately causes the display 55 to display a variety of motion graphics in accordance with the tune of a reproduced musical piece and changes in the tune.

The musical piece reproducing system 1 according to the present embodiment described above may be modified as follows: For example, part or entirety of the functions of the sound reproducing apparatus 50 may be incorporated in the portable communication terminal 10.

The portable communication terminal 10 may be configured to store the motion graphic data D2 on a category basis in the storage unit 13. The control unit 11 of the portable communication terminal 10 may be configured to acquire the lyrics data DL, the musical piece category data DG, and the musical piece structure data DS corresponding to the musical piece data D1 to be reproduced from the servers 70 and 90 via the communication unit 17. When a musical piece is reproduced based on the musical piece data D1, the control unit 11 may cause the display with which the user interface 15 is provided to display motion graphics in synchronization with the progress of the musical piece on the basis of data acquired from the servers 70 and 90. The reproduced sound based on the musical piece data D1 may be outputted via a loudspeaker (not shown) of the portable communication terminal 10.

In the case where the entire functions of the sound reproducing apparatus 50 are substantially incorporated in the portable communication terminal 10, the sound reproducing apparatus 50 is not required in the musical piece reproducing system 1. That is, in the musical piece reproducing system 1, a single apparatus having the functions of the portable communication terminal 10 and the sound reproducing apparatus 50 integrated with each other may be provided in place of the portable communication terminal 10 and the sound reproducing apparatus 50. The single apparatus may be a portable communication terminal.

The portable communication terminal 10 may be configured to use the sound reproducing apparatus 50 simply as the loudspeaker 54 and the display 55. That is, the portable communication terminal 10 may be configured to transmit the signal for reproduction based on the musical piece data D1 and a video signal representing motion graphics in synchronization with the signal for reproduction or a stream signal formed of the signal for reproduction and the video signal integrated with each other to the sound reproducing apparatus 50. In this case, the sound reproducing apparatus 50 may operate in such a way that a musical piece based on the signal received from the portable communication terminal 10 is reproduced via the loudspeaker 54 and the display 55 is caused to display the motion graphics. The portable communication terminal 10 may be replaced with another electronic apparatus having no portability, such as a desktop computer.

Motion graphics that the display 55 is caused to display may be determined in consideration of the volume of the sound reproduced via the loudspeaker 54 or the position of a volume knob. The sound reproducing apparatus 50 may be configured to determine motion graphics that the display 55 is caused to display by using not only the category and the structure of a musical piece but the volume of the reproduced sound and the position of the volume knob as parameters. In an environment in which the volume of the reproduced sound is small, to form a calm listening space, it is conceivable to cause the display 55 to display more mildly changing motion graphics than an environment in which the volume of the reproduced sound is large.

Figure 10:
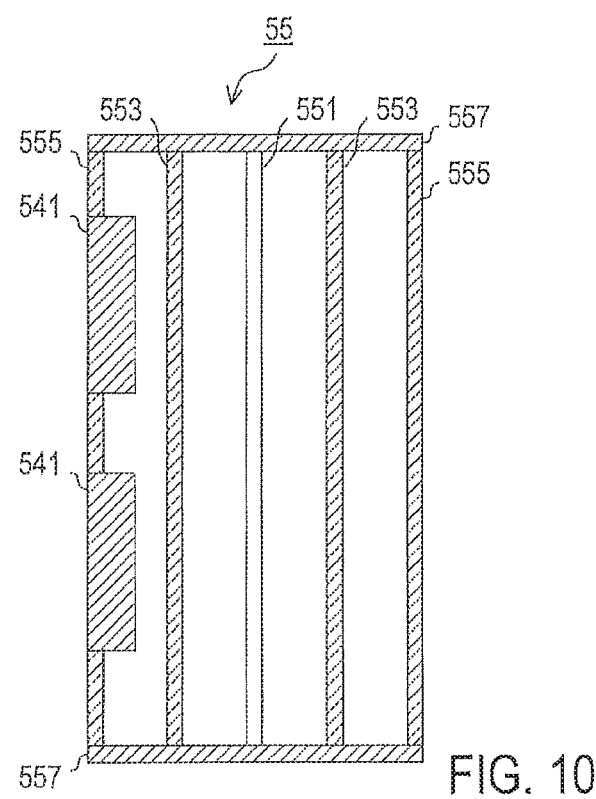
FIG. 10 shows a detailed configuration of a display.

The display 55 may be configured as shown in FIG. 10. The display 55 shown in FIG. 10 has a configuration in which transparent plates 553 and 555 are so disposed as to cover opposite surfaces of a liquid display body 551. Specifically, the display 55 has a configuration in which a pair of transparent plates 553 is so disposed as to sandwich the opposite surfaces of the liquid crystal display body 551 and a pair of transparent plates 555 are so disposed as to sandwich the opposite sides of the pair of transparent plates 553.

The display 55 has a box-shaped configuration in which the liquid crystal display body 551, the transparent plates 553, and the transparent plates 555 are accommodated in the order described above in a frame 557. The pair of transparent plates 555 form the outer surface of the box-shaped display 55. Out of the pair of transparent plates 555, in the transparent plate 555 facing the display surface of the liquid crystal display body 551 are incorporated a plurality of loudspeaker units 541, which form the loudspeaker 54.

The loudspeaker units 541 are so disposed as to partially cover the display surface of the liquid crystal display body 551. Examples of the loudspeaker units 541 include a tweeter and a squawker. Resulting from the arrangement of the loudspeaker units 541, the transparent plates 555 each function as a sound vibration surface, and the transparent plates 553 function to suppress transmission of the sound vibration to the liquid crystal display body 551. The integration of the loudspeaker 54 with the display 55 described above allows the sound reproducing apparatus 50 having an excellent exterior appearance to be readily manufactured.

Figure 11:
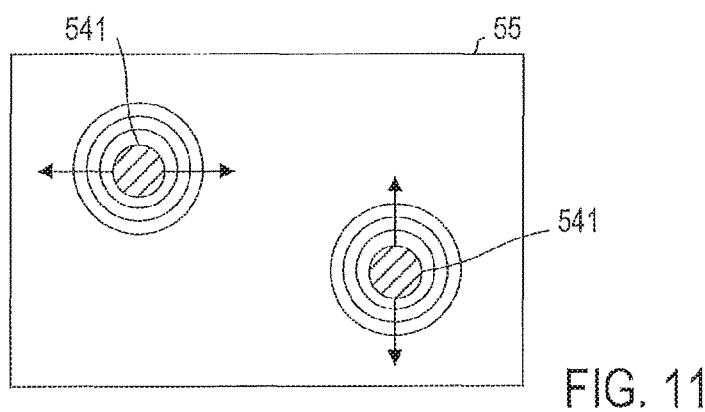
FIG. 11 shows an example of a motion graphic that radially spreads from the circumference of each loudspeaker unit.
Figure 12:
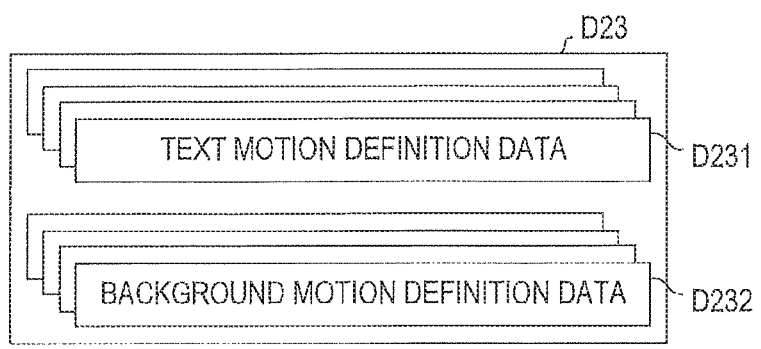
FIG. 12 shows the configuration of component data according to a second embodiment.

In the sound reproducing apparatus 50 including the loudspeaker 54 and the display 55 integrated with each other, the display control portion 515 may be configured to control the display 55 in such a way that the display 55 is caused to display a motion graphic in which a geometric figure radially spreads from the circumference of each of the loudspeaker units 541 as one type of motion graphic. In FIG. 11, the liquid crystal display body 551 displays a motion graphic in which waves radially spread from the circumference of each of the loudspeaker units 541, as indicated by the arrows in FIG. 11.

In addition to the above, the display control portion 515 may be configured to control the display 55 in such a way that a letter image that forms a motion graphic vibrates in accordance with at least one of the intonation or rhythm in a reproduced portion of a musical piece.

The musical piece reproducing system 1 may be configured as shown in a second embodiment. A musical piece reproducing system according to the second embodiment is a variation of the musical piece reproducing system 1 according to the first embodiment. In the following sections, when the musical piece reproducing system according to the second embodiment is described, the same constituent portions as those of the musical piece reproducing system 1 according to the first embodiment will not be described as appropriate. In the musical piece reproducing system according to the second embodiment, portions having the same reference signs as those in the musical piece reproducing system 1 according to the first embodiment may be taken to be the same in terms of hardware configuration as those in the first embodiment. Software configurations of portions having the same reference signs as those in the first embodiment may also be taken to be basically the same as those in the first embodiment unless replacement processes are particularly described.

Second Embodiment

The musical piece reproducing system according to the second embodiment has the configuration in which the storage unit 53 stores the motion graphic data D2 on a musical piece category basis, as in the first embodiment. It is, however, noted that the motion graphic data D2 contains component data D23 specific to the present embodiment on a section basis in place of the component data D21 in the first embodiment.

Each component data D23 has a plurality of text motion definition data D231 and a plurality of background motion definition data D232. Each of the text motion definition data D231 corresponds to the text motion definition data D211 in the first embodiment and defines the font type and size of a letter image that the display 55 is caused to display and the pattern and speed of the motion of the letter image. Each of the background motion definition data D232 corresponds to the background motion definition data D212 in the first embodiment and defines the type of a background image that the display 55 is caused to display along with the letter image and the pattern and speed of the motion of the background image.

Specifically, the text motion definition data D231 and the background motion definition data D232 are provided on a lyric type basis. Each of the text motion definition data D231 defines a motion graphic for a letter image that should be displayed when lyrics of the corresponding type are reproduced. Each of the background motion definition data D232 defines a motion graphic for a background image that should be displayed when lyrics of the corresponding type are reproduced. A motion graphic for a background image is so defined as to match a motion graphic for a letter image.

Figure 13:
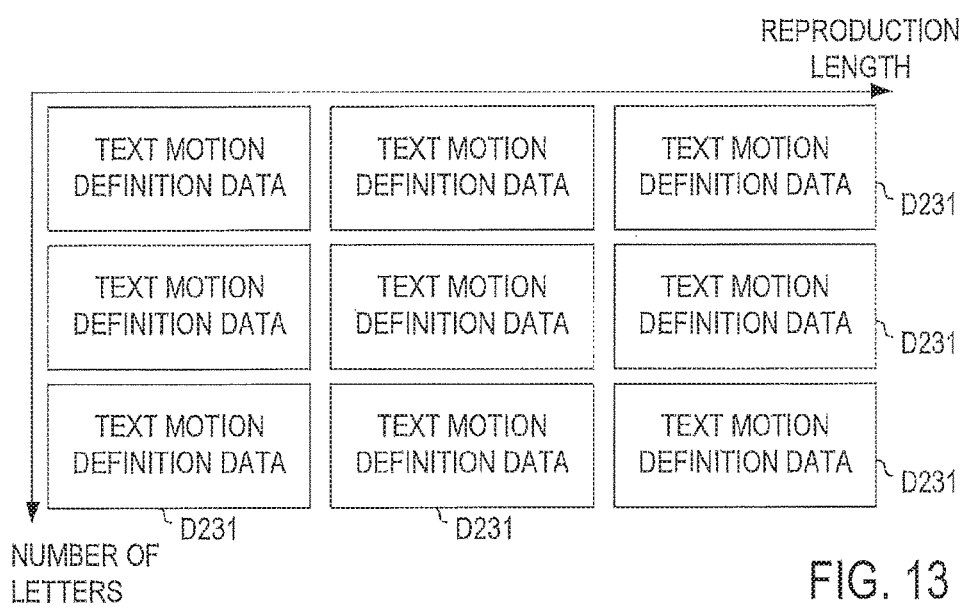
FIG. 13 describes text motion definition data according to the second embodiment.

The type of lyrics used herein is the type specified by the number of letters in the lyrics and a reproduction length. The reproduction length is the period for which lyrics corresponding to the number of letters described above are sang. That is, in a component data D23, text motion definition data D231 are prepared for combinations of the number of lyrics letters and the reproduction length, as conceptually shown in FIG. 13. Similarly, in a component data D23, background motion definition data D232 are prepared for combinations of the number of lyrics letters and the reproduction length.

When a musical piece is reproduced, the data acquisition portion 511 and the display control portion 515 cooperate with each other to display a motion graphic based on the text motion definition data D231 and the background motion definition data D232 that agree with the number of lyrics letters and the reproduction length corresponding to the reproduction position in the display 55.

The number of lyrics letters and the reproduction length described above are determined on a predetermined letter string unit basis in the entire lyrics of a musical piece. The text motion definition data D231 and the background motion definition data D232 are so properly used on the predetermined letter string unit basis that a motion graphic is switched from one to another. The letter string unit described above is, for example, each row of lyrics. In a case where lyrics are written with a space between words in the lyrics data DL, the letter string unit described above may be a letter string unit separated by the space.

Figure 14:
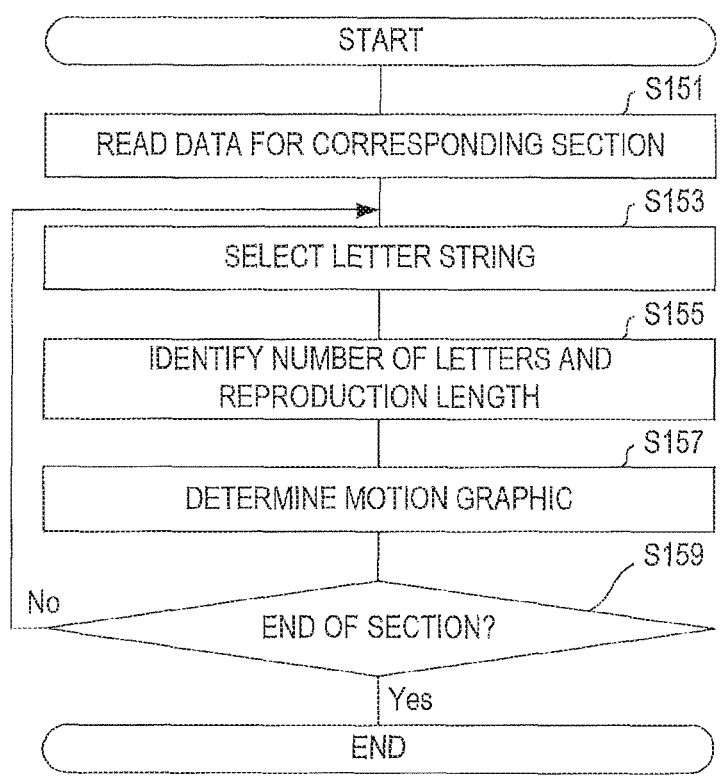
FIG. 14 is a flowchart showing processes carried out by a data acquisition portion in the second embodiment.

In S150, the data acquisition portion 511 in the second embodiment can carry out the processes shown in FIG. 14 for each section of the musical piece to be reproduced to create a motion graphic reproduction plan. The data acquisition portion 511, after it starts the processes shown in FIG. 14, first reads the component data D23 for the corresponding section from the motion graphic data D2 (S151).

The data acquisition portion 511 then selects a letter string of the lyrics in the corresponding section sequentially from the first letter string as a target to be processed (S153) and identifies the number of letters and the reproduction length of the selected letter string to be processed (S155). The reproduction length can be identified, for example, by referring to a time code contained in the lyrics data DL. The data acquisition portion 511 then refers to the text motion definition data D231 and the background motion definition data D232 corresponding to the identified number of letters and reproduction length to determine motion graphics for a musical piece portion corresponding to the processing target letter string selected in S153, specifically, a motion graphic for the letter string to be processed and a motion graphic for the background image that the display 55 is caused to display when the musical piece portion is reproduced (S157).

The data acquisition portion 511 repeatedly carries out the processes in S153 to S157 described above until the end of the corresponding section is reached. After the data acquisition portion 511 carries out the processes described above, and the end of the corresponding section is reached (Yes in S159), the data acquisition portion 511 stops creating the reproduction plan for the corresponding section and terminates the processes shown in FIG. 14. The reproduction plan for the corresponding section used herein corresponds to data representing the sequence (that is, display procedure) of the motion graphics of the letter strings and the motion graphics of the background images in the section according to the result of the determination in S157.

According to the example shown in FIG. 15A, for the lyrics in the first row, for letter string units written with a space therebetween, motion graphics TM11, TM12, and TM13 for the letter strings are determined, and motion graphics BM11, BM12, and BM13 for background images are determined in correspondence with the motion graphics TM11, TM12, and TM13. The asterisks shown in FIGS. 15A and 15B are abstract expressions of the letters that form the lyrics.

Similarly, for the lyrics in the second row, for letter string units written with a space therebetween, motion graphics TM21 and TM22 for the letter strings are determined, and motion graphics BM21 and BM22 for background image are determined in correspondence with the motion graphics TM21 and TM22.

In S150, the data acquisition portion 511 can carry out, in the arrangement order of the sections that form the musical piece, the processes in FIG. 14 on each of the sections and links the reproduction plans for the sections to each other to create a plan of reproduction of the entire musical piece.

Since the musical piece reproducing system according to the second embodiment described above allows motion graphics to be displayed in accordance with the characteristics of lyrics, motion graphics that further match a musical piece can be displayed on the display 55. For example, in a musical piece portion where lyrics having a large number of letters are sung, a motion graphic suitable for displaying a large number of letters can be used to display a letter string corresponding to the lyrics on the display 55. In a musical piece portion where lyrics having a small number of letters are sung, a motion graphic that allows the small number of letters to be arranged in the display screen in a well-balanced manner can be used to display a letter string corresponding to the lyrics on the display 55.

The musical piece reproducing system according to the second embodiment may be modified as follows: for example, motion graphics BM1 and BM2 of background images may be determined on a row basis. For example, as for the background image, the data acquisition portion 511 can determine a motion graphic for the background image on the row basis by referring to the background motion definition data D232 corresponding to the number of letters in the row and the reproduction length of the row.

Alternatively, as for the background image, the data acquisition portion 511 may be configured to refer to the background motion definition data D232 corresponding to the number of letters and the reproduction length of the first letter string in the corresponding row to determine a motion graphic for the background image for the entire row. The data acquisition portion 511 may be configured to create a reproduction plan in which the motion graphic for the background image is not changed in a single row. The motion graphic for a letter image may similarly be determined on a row basis.

The musical piece reproducing system according to the second embodiment may be modified as shown in a third embodiment. In the following sections, when the musical piece reproducing system according to the third embodiment is described, the same constituent portions as those of the musical piece reproducing system according to the second embodiment will not be described as appropriate. Portions of the musical piece reproducing system according to the third embodiment may be taken to have the same configurations as those in the second embodiment unless replacement processes are particularly described.

Third Embodiment

Figure 16:
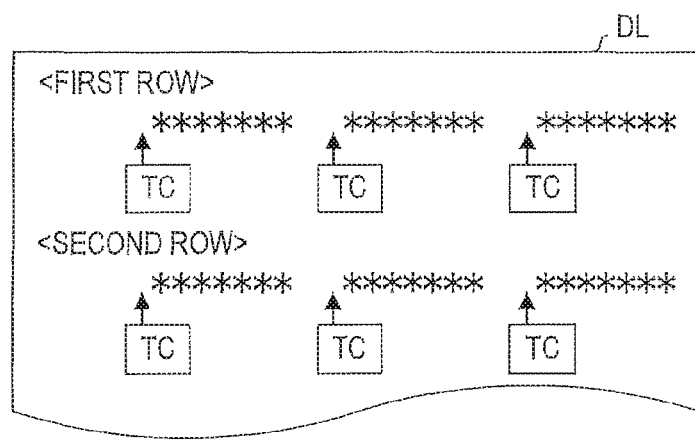
FIG. 16 shows the configuration of lyrics data.

The musical piece reproducing system according to the third embodiment is configured to use the lyrics data DL to which a time code TC is attached to control the display of a motion graphic for a letter image, as shown in FIG. 16. The time code TC is attached to lyrics on a letter string basis and represents the time when the display of the corresponding letter string starts in the form of the elapsed period since the time when the reproduction of the musical piece starts. That is, the lyrics data DL, which is formed of a plurality of letter strings defined by dividing the entire lyrics of a musical piece, has a configuration in which the time code TC representing the time when the display of each of the letter strings starts is attached to the letter string.

Specifically, the musical piece reproducing system according to the present embodiment determines a time difference TA between a first letter string and a second letter string adjacent to each other on the basis of time codes TC attached thereto and controls the timing when the display of the motion graphic for the first letter string is terminated on the basis of the time difference TA.

Figure 17A:
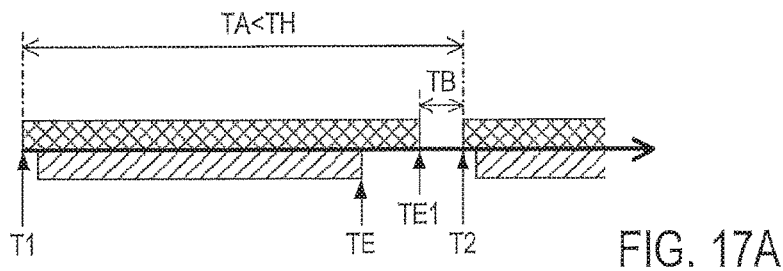
FIGS. 17A to 17C show motion graphic switching aspects in a third embodiment.

As for the first and second letter strings adjacent to each other, in a case where the time difference TA=T2−T1 between display start time T1, which is represented by the time code TC attached to the preceding first letter string, and display start time T2, which is represented by the time code TC attached to the second letter string following the first letter string, is smaller than a threshold TH, the timing when the display of the motion graphic for the first letter string ends is controlled to be time TE1, which is time a predetermined period TB before the time T2, as shown in FIG. 17A.

Figure 17B:
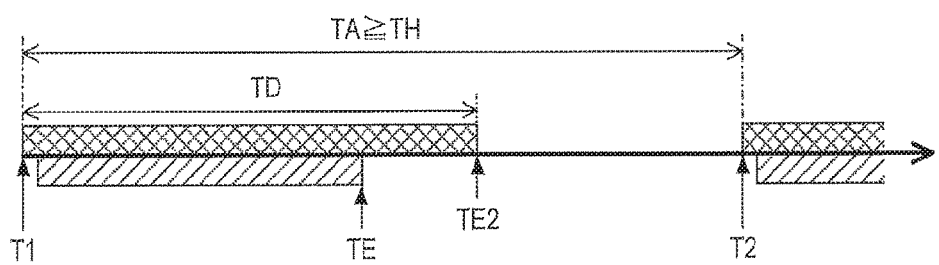

In a case where the time difference TA is greater than or equal to the threshold TH, the timing when the display of the motion graphic for the first letter string ends is controlled to be time TE2, which is time a predetermined period TD after the display start time T1, when the display of the first letter string starts, as shown in FIG. 17B. In FIGS. 17A and 17B, the thick arrows represent the time flow, each area hatched in a mesh form represent the period for which a motion graphic for a letter string is displayed, and each area hatched in an oblique-line form represent the period for which the corresponding letter string is sung. As can be understood from FIG. 17B, the predetermined period TD is so determined that the time TE2 follows the time TE when the period for which the corresponding letter string is sung ends.

In S150, the data acquisition portion 511 may carry out the processes shown in FIG. 14 for each section that forms a musical piece to create a motion graphic reproduction plan. The data acquisition portion 511, when it starts the processes shown in FIG. 14, carries out the processes in S151 to S159, as in the second embodiment. It is, however, noted that in S157, the data acquisition portion 511 carries out the processes shown in FIG. 18 to determine the timing when the display of the motion graphic for the processing target letter string selected in S153 ends. In S153, the data acquisition portion 511 sequentially selects a letter string as a target to be processed for each letter string to which the corresponding time code TC is attached.

Figure 18:
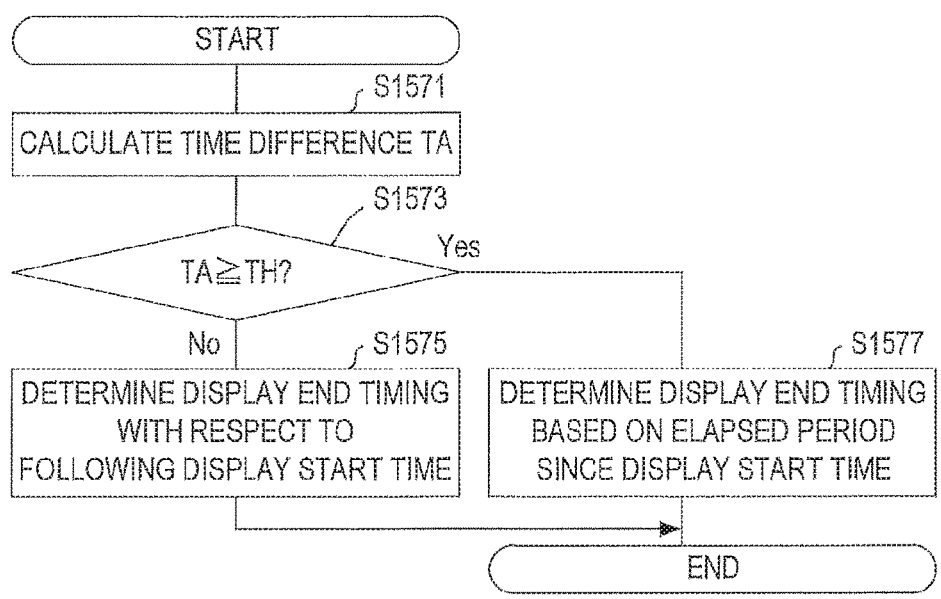
FIG. 18 is a flowchart showing processes carried out by the data acquisition portion in the third embodiment.

According to the processes shown in FIG. 18, the data acquisition portion 511 calculates the time difference TA between the time T1, when the display of the processing target letter string selected in S153 starts and which is identified from the time code TC attached to the letter string, and the time T2, when the display of the subsequent letter string adjacent to the processing target letter string starts and which is identified by the time code TC attached to the letter string (S1571).

The data acquisition portion 511 then compares the calculated time difference TA with a prespecified threshold TH and determines whether or not the time difference TA is greater than or equal to the threshold TH (S1573).

In a case where it is determined that the time difference TA is smaller than the threshold TH (No in S1573), the data acquisition portion 511 determines the timing when the display of the motion graphic for the processing target letter string ends to be time TE1 (S1575). The time TE1 is time the predetermined period TB before the display start time T2 when the display of the subsequent letter string starts. The data acquisition portion 511 then terminates the processes shown in FIG. 18.

In a case where it is determined that the time difference TA is greater than or equal to the threshold TH (Yes in S1573), the data acquisition portion 511 determines the timing when the display of the motion graphic for the processing target letter string ends to be time TE2 (S1577). The time TE2 is time the predetermined period TD after the display start time T1 when the display of the processing target letter string starts (S1577). The data acquisition portion 511 then terminates the processes shown in FIG. 18.

The data acquisition portion 511 thus creates a reproduction plan in which the motion graphic display end timing is specified. In the reproduction plan, the timing when the display of a motion graphic for each letter string starts is specified to be the time represented by the time code TC attached to the corresponding letter string. The timings when the display of a motion graphic for a background image starts and ends may accord with the timings when the display of a motion graphic for a letter string starts and ends.

According to the present embodiment, a situation in which during the reproduction of a musical piece, a letter string of the lyrics having been sung remains displayed on the display 55 for a long period and a user therefore feels discomfort can be avoided.

In a case where the process in S1577 causes the timing when the display of the processing target letter string ends to be adjusted to timing considerably before the time T2, when the display of a motion graphic for the subsequent letter string starts, the display on the display 55 rests after the display of the processing target letter string ends and before the display of a motion graphic for the subsequent letter string starts.

Figure 17C:
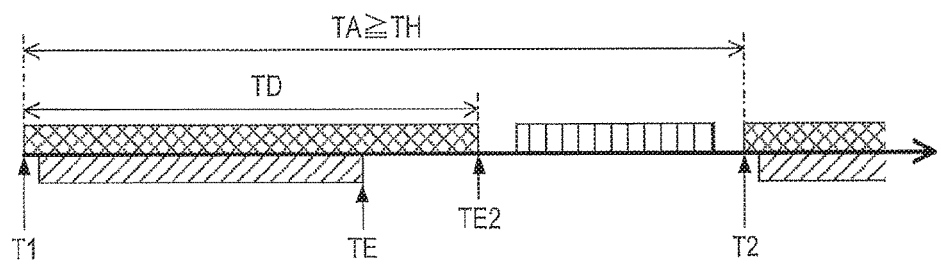
Figure 19:
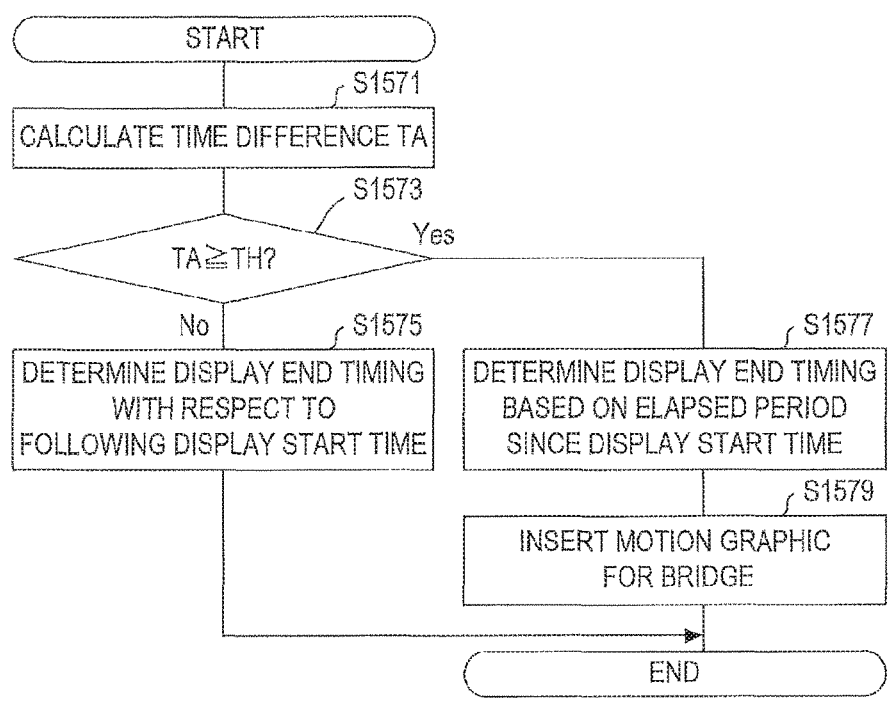
FIG. 19 is a flowchart showing processes carried out by the data acquisition portion in a variation.

Therefore, as shown in FIG. 19, the processing may proceed to S1579 after the process in S1577 ends, and the data acquisition portion 511 may create a reproduction plan in which a motion graphic for bridge is displayed on the display 55 for the period between the time TE2, when the display of the motion graphic for the processing target letter string ends, and the time T2, when the display of the motion graphic for the subsequent letter string starts. The area hatched in the vertical stripe form in FIG. 17C represents the period for which a motion graphic for bridge is displayed.

Fourth Embodiment

A musical piece reproducing system 4 according to a fourth embodiment, which will be subsequently described, has a configuration in which part of the functions provided by the sound reproducing apparatus 50 in the first embodiment is provided by an acceptance server 80. The hardware configuration of the musical piece reproducing system 4 according to the fourth embodiment is basically the same as that of the musical piece reproducing system 1 according to the first embodiment except that the acceptance server 80 is provided between the sound reproducing apparatus 50 and the first and second servers 70, 90.

Figure 20:
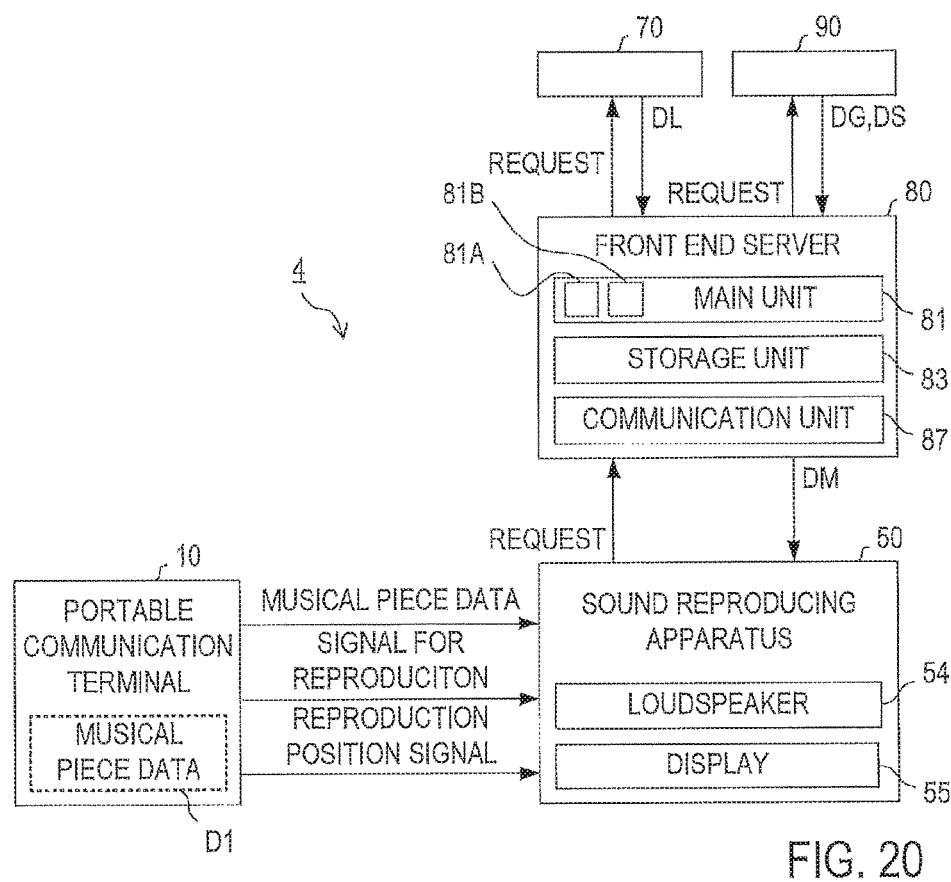
FIG. 20 is a block diagram showing a schematic configuration of a musical piece reproducing system according to a fourth embodiment.

In the following sections, the configuration of the acceptance server 80 and the action of the acceptance server 80 will be described with reference to FIGS. 20 and 22, and the details of processes carried out by the sound reproducing apparatus 50 in place of the processes shown in FIG. 9 will be described with reference to FIG. 21. Portions provided in the musical piece reproducing system 4 according to the fourth embodiment and having the same configurations as those in the musical piece reproducing system 1 according to the first embodiment will not be described as appropriate. It may be understood that portions having the same reference signs as those in the musical piece reproducing system 1 according to the first embodiment have the same configurations as those in the first embodiment in terms of hardware configuration.

The acceptance server 80 according to the present embodiment is so installed as to be capable of communicating with the sound reproducing apparatus 50 over the wide area network. The acceptance server 80 is configured to provide, in accordance with a request from the sound reproducing apparatus 50, the sound reproducing apparatus 50 with data DM for displaying motion graphics that match a musical piece reproduced by the sound reproducing apparatus 50.

The acceptance server 80 includes a main unit 81, a storage unit 83, and a communication unit 87. The main unit 81 includes a CPU 81A and a RAM 81B, and the CPU 81A carries out processes according to a variety of programs. The RAM 81B is used as a work area when the CPU 81A carries out a process. In the following sections, a process carried out by the CPU 81A in accordance with a program is described as a process carried out by the acceptance server 80 or the main unit 81.

The storage unit 83 stores a variety of programs and data. The data stored in the storage unit 83 includes the motion graphic data D2 (see FIG. 3) on a musical piece category basis. The communication unit 87 is configured to be capable of communicating with the sound reproducing apparatus 50, the first server 70, and the second server 90 over the wide area network.

The first server 70 is configured to transmit, in accordance with a request signal from the acceptance server 80, the lyrics data DL requested by the acceptance server 80 to the acceptance server 80. The second server 90 is configured to transmit, in accordance with a request signal from the acceptance server 80, the musical piece category data DG, which represents the category of a musical piece requested by the acceptance server 80, and the musical piece structure data DS, which represents the structure of the musical piece, to the acceptance server 80.

Figure 9:
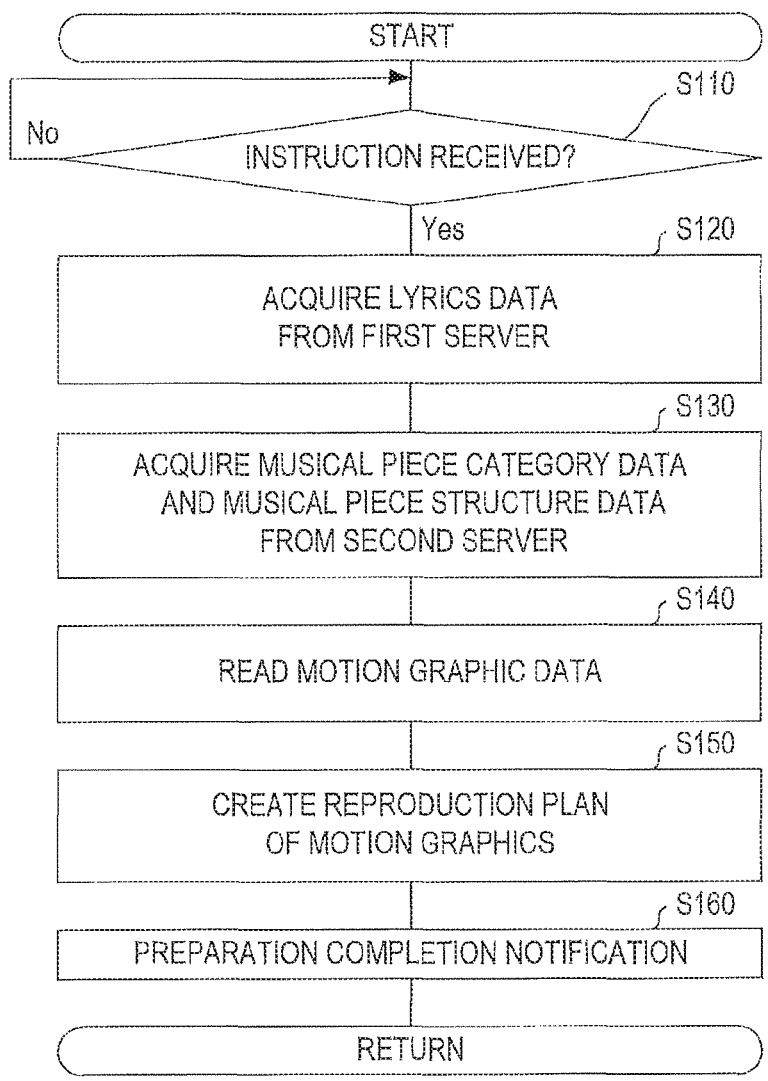
FIG. 9 is a flowchart showing processes carried out by a data acquisition portion.
Figure 21:
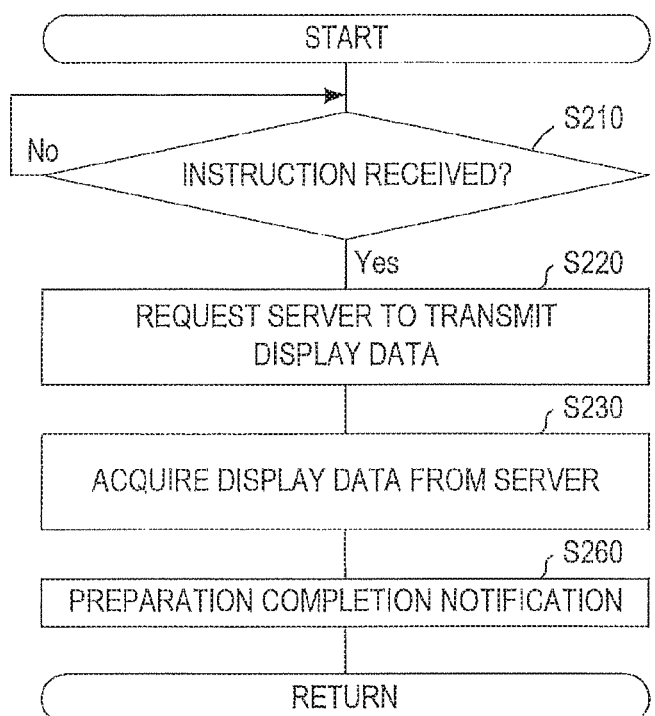
FIG. 21 is a flowchart showing processes carried out by the sound reproducing apparatus in the fourth embodiment.

The data acquisition portion 511 of the sound reproducing apparatus 50 repeatedly carries out the processes shown in FIG. 21 in place of the processes shown in FIG. 9. The data acquisition portion 511 waits until it receives an action instruction transmitted from the portable communication terminal 10 via the communication unit 57 (S210).

The data acquisition portion 511, when it receives the action instruction (Yes in S210), transmits a request signal containing musical piece name data attached to the action instruction and requesting display data DM for displaying motion graphics that correspond to the musical piece name data and should be displayed when the musical piece is reproduced to the acceptance server 80 via the communication unit 57 (S220).

The data acquisition portion 511 receives the display data DM transmitted from the acceptance server 80 in accordance with the request signal via the communication unit 57 (S230), and upon the reception, transmits preparation completion notification to the portable communication terminal 10 (S260).

In response to the preparation completion notification, the portable communication terminal 10 starts performing reproduction processing of the musical piece data D1 and transmits the signal for reproduction and the reproduction position signal, as in the first embodiment. The display control portion 515 of the sound reproducing apparatus 50 receives the reproduction position signal via the communication unit 57 and controls the display 55 in such a way that motion graphics corresponding to sound of the reproduced musical piece from the loudspeaker 54 are displayed on the display 55 on the basis of the reproduction position signal and the display data DM. The control unit 51 thus controls the display 55 in such a way that motion graphics containing letter images of the lyrics are displayed on the display 55 in synchronization with the progress of the reproduced musical piece.

The display data DM provided to the sound reproducing apparatus 50 in the present embodiment corresponds to the reproduction plan in the first embodiment. It is, however, noted that the sound reproducing apparatus 50 in the present embodiment may not include the motion graphic data D2. The reproduction plan may therefore be configured to include information on reference to the motion graphic data D2, but the display data DM contains no information on reference to the motion graphic data D2. That is, the display data DM is configured as data that allows the sound reproducing apparatus 50 to display motion graphics corresponding to a musical piece on the display 55 by using no motion graphic data D2. The display data DM may be data containing a program that the display control portion 515 can interpret or moving picture data.

Figure 22:
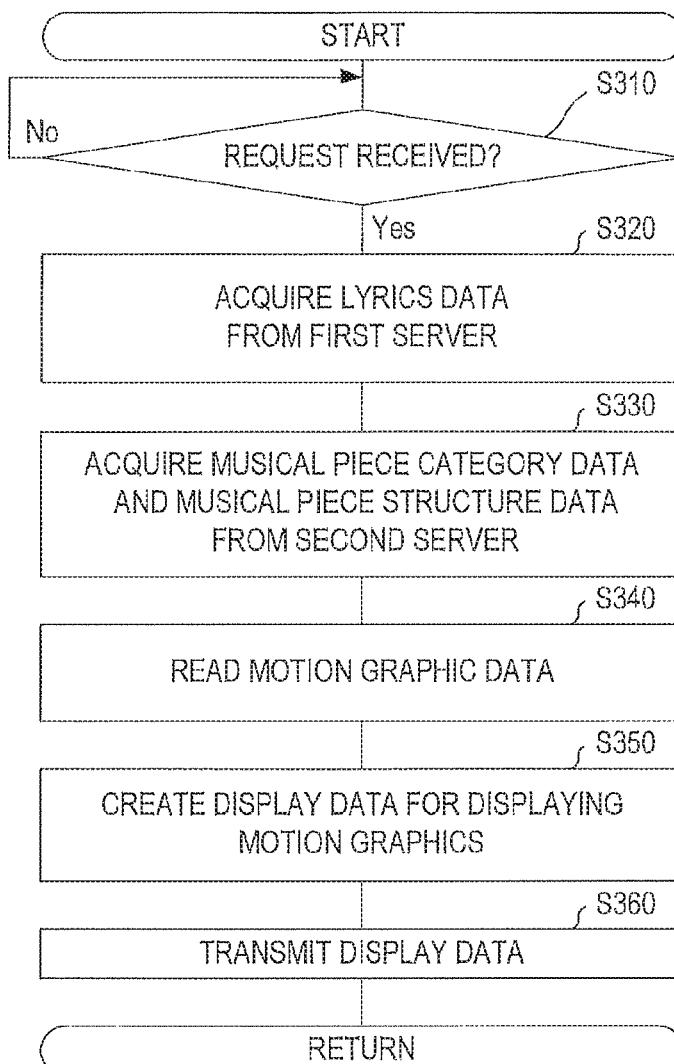
FIG. 22 is a flowchart showing processes carried out by an acceptance server in the fourth embodiment.

The main unit 81 of the acceptance server 80 repeatedly carries out the processes shown in FIG. 22 to receive the request signal transmitted by the sound reproducing apparatus 50 in S220 and provide the display data DM according to the request signal to the sound reproducing apparatus 50.

In the processes shown in FIG. 22, the main unit 81 waits until it receives the request signal with the musical piece name data of a musical piece to be reproduced from the sound reproducing apparatus 50 via the communication unit 87 (S310). The main unit 81, when it receives the request signal, acquires the corresponding lyrics data DL from the first server 70 via the communication unit 87 on the basis of the received musical piece name data (S320). The main unit 81 further acquires the corresponding musical piece category data DG and musical piece structure data DS from the second server 90 (S330).

The main unit 81 then identifies the category of the musical piece to be reproduced on the basis of the musical piece category data DG and reads the motion graphic data D2 relating to the identified musical piece category from the storage unit 83 (S340).

The main unit 81 further creates the display data DM for displaying motion graphics corresponding to the types and arrangement of sections that form the musical piece and corresponding to the reproduction plan in the first embodiment on the basis of the group of component data D21 and the motion data for connection D22 contained in the read motion graphic data D2 and the types and arrangement of the sections that form the musical piece and are determined from the musical piece structure data DS (S350).

Specifically, the main unit 81 determines the types and arrangement of the sections contained in the musical piece to be reproduced on the basis of the musical piece structure data DS with the types and arrangement related to the temporal axis that starts at the reproduction start time. The main unit 81 then creates the display data DM that allows the sound reproducing apparatus 50 to display, when a musical piece portion corresponding to each of the sections is reproduced, a motion graphic defined by the motion graphic data D2 corresponding to the category of the musical piece in accordance with the type of the section to be reproduced.

For example, the main unit 81 attaches information on the font type and size of a letter image represented by the text motion definition data D211 and the pattern and speed of the motion of the letter image represented by the text motion definition data D211 to each letter string that forms the lyrics identified from the lyrics data DL acquired from the first server 70 and thereby incorporates data for displaying text motion graphics relating to the lyrics into the display data DM.

The main unit 81 then transmits the created display data DM to the requesting sound reproducing apparatus 50 via the communication unit 87 (S360). According to the present embodiment, part of the functions provided by the sound reproducing apparatus 50 in the first embodiment is achieved by the acceptance server 80.

The present disclosure is not limited to the embodiments described above and can employ a variety of other aspects. The technical idea of providing the acceptance server 80 with part of the functions provided by the sound reproducing apparatus 50 may be applied to the second and third embodiments. The display data DM may simply be a set of the component data D21 extracted from the motion graphic data D2 and corresponding to the sections contained in the reproduced musical piece. In this case, the display data DM may contain the lyrics data DL and the musical piece structure data DS.

The component data D21 and D23 may not be provided on a section type basis. That is, component data D21 and D23 common to all sections may be stored in the motion graphic data D2. The motion graphic data D2 may be configured to contain the component data D21 for each type of the lyrics.

A function provided by one component in each of the embodiments described above may be provided by a plurality of components in a shared manner, or a function provided by a plurality of components may be provided by a single component. Part of the configurations in each of the embodiments may be omitted. At least part of the configurations in each of the embodiments may be added to, replaced with, or otherwise changed in the configurations in any of the other embodiments. Every aspect contained in the technical idea identified from the words described in the claims is an embodiment of the present disclosure.

The correspondence between the terms described above is as follows: The loudspeaker 54 corresponds to an example of a sound device; the display 55 corresponds to an example of a display device; and the reproduction control portion 513 corresponds to an example of a reproduction control unit. The process in S150 carried out by the data acquisition portion 511 and the processes carried out by the display control portion 515 correspond to an example of processes carried out by a display control unit. The process in S210 carried out by the data acquisition portion 511 and the processes in S310 to S330 carried out by the main unit 81 correspond to an example of processes carried out by an acquisition unit. The processes in S340 to S360 carried out by the main unit 81 correspond to an example of processes carried out by an output unit.

The invention claimed is:

1. A musical piece reproducing system comprising:
a controller configured to control a sound device and a display device;
a storage device configured to store motion graphic data, the motion graphic data including definition data defining, for each type of a musical piece portion, a corresponding motion graphic that the display device should display when a musical piece portion that belongs to a corresponding type is reproduced; and
a communication device,
the controller carrying out processes including:
acquiring lyrics data of a musical piece through the communication device;
causing the sound device to reproduce the musical piece; and
causing the display device to display motion graphics corresponding to the musical piece in synchronization with progress of the musical piece reproduced by the sound device, based on the motion graphic data stored in the storage device and the acquired lyrics data,
wherein causing the display device to display the motion graphics includes:
determining the type of each of musical piece portions contained in the musical piece reproduced by the sound device; and
controlling the display device in such a way that the display device displays a motion graphic of a letter string representing a lyrics portion corresponding to time in the reproduction of the musical piece, in accordance with the definition data in the motion graphic data corresponding to the type of a musical piece portion reproduced by the sound device out of the musical piece portions;
wherein the lyrics data has a time code representing time when display of a corresponding letter string starts, for each of letter strings specified by dividing entire lyrics of the musical piece,
wherein the controlling includes controlling the display device in such a way that the display device displays a motion graphic relating to a letter string, to which the time code corresponding to time in the reproduction of the musical piece is attached; and
wherein the controlling includes determining a time difference between the time codes attached to a first letter string and a second letter string out of the letter strings, the first letter string and the second letter string adjacent to each other and the first letter string followed by the second letter string, and controlling the display device in such a way that the display device displays another motion graphic after display of a motion graphic relating to the first letter string but before display of a motion graphic relating to the second letter string in a case where the time difference is greater than or equal to a reference.

2. The musical piece reproducing system according to claim 1,
wherein the motion graphic data includes first definition data that defines the motion graphics of the letter strings and second definition data that defines motion graphics of background images, for each type of the musical piece portion,
the controlling includes controlling the display device in such a way that the display device displays the motion graphics of the background images together with the motion graphics of the letter strings, in accordance with the first definition data and the second definition data.

3. The musical piece reproducing system according to claim 1,
wherein the storage device stores the motion graphic data on a musical piece category basis, and
causing the display device to display motion graphics is carried out based on motion graphic data corresponding to the category of the musical piece reproduced by the sound device.

4. The musical piece reproducing system according to claim 1, wherein the motion graphic data defines, for each type of a section that forms a musical piece, corresponding definition data.

5. The musical piece reproducing system according to claim 1, wherein the controlling includes, in a case of switching a motion graphic displayed by the display device from a first motion graphic to a second motion graphic when the type of the reproduced musical piece portion is switched, controlling the display device in such a way that the display device displays a motion graphic for transition having characteristics that is a mixture of characteristics of the first motion graphic and characteristics of the second motion graphic before switching to the second motion graphic.

6. The musical piece reproducing system according to claim 1, wherein the type of the musical piece portion corresponds to a type of lyrics in the musical piece portion.

7. The musical piece reproducing system according to claim 6, wherein the type of lyrics is determined by at least one of a number of letters of the lyrics or a reproduction length.

8. The musical piece reproducing system according to claim 1, wherein the controlling includes controlling the display device in such a way that a letter image that forms a motion graphic vibrates in synchronization with at least one of intonation or rhythm in a reproduced portion of the musical piece.

9. A musical piece reproducing method comprising:
acquiring lyrics data of a musical piece;
causing a sound device to reproduce the musical piece; and
causing a display device to display motion graphics corresponding to the musical piece in synchronization with progress of the musical piece reproduced by the sound device, based on motion graphic data stored in a storage device and the acquired lyrics data,
wherein the motion graphic data includes definition data defining, for each type of a musical piece portion, a corresponding motion graphic that the display device should display when a musical piece portion that belongs to a corresponding type is reproduced, and
the causing the display device to display the motion graphics includes:
  determining the type of each of musical piece portions contained in the musical piece reproduced by the sound device; and
  controlling the display device in such a way that the display device displays a motion graphic of a letter string representing a lyrics portion corresponding to time in the reproduction of the musical piece, in accordance with the definition data in the motion graphic data corresponding to the type of a musical piece portion reproduced by the sound device out of the musical piece portions;
wherein the lyrics data has a time code representing time when display of a corresponding letter string starts, for each of letter strings specified by dividing entire lyrics of the musical piece,
wherein the controlling includes controlling the display device in such a way that the display device displays a motion graphic relating to a letter string, to which the time code corresponding to time in the reproduction of the musical piece is attached; and
wherein the controlling includes determining a time difference between the time codes attached to a first letter string and a second letter string out of the letter strings, the first letter string and the second letter string adjacent to each other and the first letter string followed by the second letter string, and controlling the display device in such a way that the display device displays another motion graphic after display of a motion graphic relating to the first letter string but before display of a motion graphic relating to the second letter string in a case where the time difference is greater than or equal to a reference.

10. The musical piece reproducing method according to claim 9,
wherein the motion graphic data includes first definition data that defines the motion graphics of the letter strings and second definition data that defines motion graphics of background images, for each type of the musical piece portion,
the controlling includes controlling the display device in such a way that the display device displays the motion graphics of the background images together with the motion graphics of the letter strings, in accordance with the first definition data and the second definition data.

11. The musical piece reproducing method according to claim 9,
wherein the storage device stores the motion graphic data on a musical piece category basis, and
causing the display device to display motion graphics is carried out based on motion graphic data corresponding to the category of the musical piece reproduced by the sound device.

12. The musical piece reproducing method according to claim 9, wherein the motion graphic data defines, for each type of a section that forms a musical piece, corresponding definition data.

13. The musical piece reproducing method according to claim 9, wherein the controlling includes, in a case of switching a motion graphic displayed by the display device from a first motion graphic to a second motion graphic when the type of the reproduced musical piece portion is switched, controlling the display device in such a way that the display device displays a motion graphic for transition having characteristics that is a mixture of characteristics of the first motion graphic and characteristics of the second motion graphic before switching to the second motion graphic.

14. The musical piece reproducing method according to claim 9, wherein the type of the musical piece portion corresponds to a type of lyrics in the musical piece portion.

15. The musical piece reproducing method according to claim 14, wherein the type of lyrics is determined by at least one of a number of letters of the lyrics or a reproduction length.

16. A data outputting apparatus comprising:
a controller;
a storage device configured to store motion graphic data, the motion graphic data including definition data defining, for each type of a musical piece portion, a corresponding motion graphic that the display device should display when a musical piece portion that belongs to a corresponding type is reproduced; and
a communication device,
the controller carrying out processes including:
  acquiring lyrics data of a musical piece through the communication device;
  determining the type of each of musical piece portions contained in the musical piece reproduced by the sound device; and
  outputting, based on the motion graphic data stored in the storage device and the acquired lyrics data, display data for causing the display device to display motion graphics corresponding to the musical piece in synchronization with progress of the musical piece reproduced by the sound device, through the communication device,
wherein the display data is configured to control the display device in such a way that, when the musical piece is reproduced by the sound device, the display device displays a motion graphic of a letter string representing a lyrics portion corresponding to time in the reproduction of the musical piece, in accordance with definition data in the motion graphic data corresponding to the type of a corresponding musical piece portion;
wherein the lyrics data has a time code representing time when display of a corresponding letter string starts, for each of letter strings specified by dividing entire lyrics of the musical piece, and
  controlling the display device in such a way that the display device displays a motion graphic relating to a letter string, to which the time code corresponding to time in the reproduction of the musical piece is attached, wherein the controlling includes determining a time difference between the time codes attached to a first letter string and a second letter string out of the letter strings, the first letter string and the second letter string adjacent to each other and the first letter string followed by the second letter string, and controlling the display device in such a way that the display device displays another motion graphic after display of a motion graphic relating to the first letter string but before display of a motion graphic relating to the second letter string in a case where the time difference is greater than or equal to a reference.

* * * * *

UNITED STATES PATENT AND TRADEMARK OFFICE
CERTIFICATE OF CORRECTION

PATENT NO. : 10,186,246 B2
APPLICATION NO. : 15/557536
DATED : January 22, 2019
INVENTOR(S) : Kohei Numata and Jin Saito It is certified that error appears in the above-identified patent and that said Letters Patent is hereby corrected as shown below:

On the Title Page

Item (71), Column 1, Line 4 - The Applicant "LYRIC ARTS INC." - should be --COTODAMA Inc.--

Signed and Sealed this
Twelfth Day of May, 2020

Andrei Iancu
*Director of the United States Patent and Trademark Office*